United States Patent [19]
Ozaki et al.

[11] Patent Number: 5,933,478
[45] Date of Patent: *Aug. 3, 1999

[54] DATA TRANSFER SYSTEM AND HANDHELD TERMINAL DEVICE USED THEREFOR

[75] Inventors: Tomochika Ozaki, Yokohama; Yoshihiko Kunimori, Hiratsuka; Kouichi Hibi, Fujisawa; Michihiro Mese, Chigasaki; Hiroshi Shimizu, Yokohama; Tooru Yokozawa, Chigasaki; Tadashi Kuwabara, Yokohama; Muneaki Yamaguchi, Kokubunji, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/534,318

[22] Filed: Sep. 27, 1995

[30] Foreign Application Priority Data

Sep. 28, 1994 [JP] Japan ................................ 6-233226
Mar. 23, 1995 [JP] Japan ................................ 7-064288

[51] Int. Cl.⁶ .................................................. H04M 11/00
[52] U.S. Cl. .................... 379/93.24; 379/100.08; 379/93.23; 379/90.01; 455/412; 455/38.4
[58] Field of Search ................... 379/96, 93, 97, 379/98, 100, 110, 90, 56, 57, 58, 59, 90.01, 93.17, 93.23, 93.24, 100.08, 100.14; 358/442, 400, 401, 402, 407, 434, 468; 340/825.44; 455/412, 413, 556, 557, 575, 31.1–31.3

[56] References Cited

U.S. PATENT DOCUMENTS

| | | | |
|---|---|---|---|
| 4,764,951 | 8/1988 | Kotani et al. | 379/100.14 |
| 5,200,988 | 4/1993 | Riskin | 379/96 |
| 5,291,302 | 3/1994 | Gordon et al. | 379/100.08 |
| 5,315,642 | 5/1994 | Fernandez | 379/96 |
| 5,392,452 | 2/1995 | Davis | 455/460 |
| 5,422,733 | 6/1995 | Merchant et al. | 379/58 |
| 5,426,594 | 6/1995 | Wright et al. | 379/96 |
| 5,463,382 | 10/1995 | Nikas et al. | 455/38.1 |
| 5,487,100 | 1/1996 | Kane | 379/96 |
| 5,493,692 | 2/1996 | Theimer et al. | 379/57 |
| 5,495,344 | 2/1996 | Callaway, Jr. et al. | 455/38.4 |
| 5,530,740 | 6/1996 | Irribarrent et al. | 379/93.24 |
| 5,561,703 | 10/1996 | Arledge et al. | 379/58 |
| 5,568,536 | 10/1996 | Tiller et al. | 379/58 |
| 5,604,788 | 2/1997 | Tett | 379/96 |

FOREIGN PATENT DOCUMENTS

6-6302 of 1994 Japan .
6-978787 of 1994 Japan .

OTHER PUBLICATIONS

"Toragi Computer", vol. 5, No. 7, Jul. 1993, pp. 84–92.

*Primary Examiner*—Stella Woo
*Attorney, Agent, or Firm*—Antonelli, Terry, Stout & Kraus, LLP

[57] ABSTRACT

In the handheld terminal device, when a message reception unit receives from a host computer a new arrival message indicating a new arrival of a file (or electronic mail), a control unit analyzes the new arrival message to obtain identifier information for identifying the file (or electronic mail) and a telephone number of the host computer. After a line connection to the host computer is established by a handheld phone transceiver unit, a fetch request command for fetching the file (or electronic mail) is transmitted to automatically fetch the file (or electronic mail) from the host computer and make the user know the contents of the file (or electronic mail) by using a display unit. A FAX transmitting user designates a destination handheld terminal device and transmits FAX image data to a communication server (CS). CS stores the received FAX image data and transmits a FAX arrival message to a pager connected to the destination handheld terminal device. A user of the handheld terminal device informed of a FAX arrival by the pager confirms the FAX brief image data contained in the message, and if necessary, calls CS by a handheld phone connected to the handheld terminal device to make CS transmit the FAX image data and refer to the detailed contents thereof.

24 Claims, 32 Drawing Sheets

FIG.25

|   | TRANSMISSION STATION | DESTINATION STATION | MESSAGE CONTENTS | FORMAT | TRANSMISSION CONDITION |
|---|---|---|---|---|---|
| ① | FAX | EXCHANGER | CS CALL TEL # | TONE/DIAL | EXCHANGER CARRIER |
| ② | FAX | CS | HTD NUMBER | TONE | CS CARRIER |
| ③ | FAX | CS | FAX IMAGE | DIGITAL SIGNAL | CS CARRIER |
| ④ | CS | EXCHANGER | PAGER CALL # | TONE/DIAL | EXCHANGER CARRIER |
| ⑤ | CS | HTD | FAX ARRIVAL MESSAGE | DIGITAL SIGNAL | PAGER CARRIER |
| ⑥ | HTD | EXCHANGER | CS CALL TEL # | TONE/DIAL | EXCHANGER CARRIER |
| ⑦ | HTD | CS | FAX TRANSMISSION REQUEST | DIGITAL SIGNAL | CS CARRIER |
| ⑧ | CS | HTD | FAX IMAGE | DIGITAL SIGNAL | HTD CARRIER |

FIG.26

|   | TRANSMISSION STATION | DESTINATION STATION | MESSAGE CONTENTS | FORMAT | TRANSMISSION CONDITION |
|---|---|---|---|---|---|
| ① | FAX | EXCHANGER | CS CALL TEL # | TONE/DIAL | EXCHANGER CARRIER |
| ② | FAX | CS | HTD NUMBER | DIGITAL SIGNAL | CS CARRIER |
| ③ | FAX | CS | FAX IMAGE | DIGITAL SIGNAL | CS CARRIER |
| ④ | CS | EXCHANGER | PAGER CALL # | TONE/DIAL | EXCHANGER CARRIER |
| ⑤ | CS | HTD | FAX ARRIVAL MESSAGE | DIGITAL SIGNAL | PAGER CARRIER |
| ⑥ | HTD | EXCHANGER | CS CALL TEL # | TONE/DIAL | EXCHANGER CARRIER |
| ⑦ | HTD | CS | FAX TRANSMISSION REQUEST | DIGITAL SIGNAL | CS CARRIER |
| ⑧ | CS | HTD | FAX IMAGE | DIGITAL SIGNAL | HTD CARRIER |

FIG.27

| | TRANSMISSION STATION | DESTINATION STATION | MESSAGE CONTENTS | FORMAT | TRANSMISSION CONDITION |
|---|---|---|---|---|---|
| ① | FAX | EXCHANGER | CS CALL TEL # | TONE/DIAL | EXCHANGER CARRIER |
| ② | FAX | CS | HTD NUMBER | DIGITAL SIGNAL | CS CARRIER |
| ③ | FAX | CS | FAX HEADER | DIGITAL SIGNAL | CS CARRIER |
| ④ | FAX | CS | FAX IMAGE | DIGITAL SIGNAL | CS CARRIER |
| ⑤ | CS | EXCHANGER | PAGER CALL # | TONE/DIAL | EXCHANGER CARRIER |
| ⑥ | CS | HTD | FAX ARRIVAL MESSAGE | DIGITAL SIGNAL | PAGER CARRIER |
| ⑦ | HTD | EXCHANGER | CS CALL TEL # | TONE/DIAL | EXCHANGER CARRIER |
| ⑧ | HTD | CS | FAX TRANS-MISSION REQUEST | DIGITAL SIGNAL | CS CARRIER |
| ⑨ | CS | HTD | FAX HEADER | DIGITAL SIGNAL | HTD CARRIER |
| ⑩ | CS | HTD | FAX IMAGE | DIGITAL SIGNAL | HTD CARRIER |

SIGNAL CONTENTS TRANSMITTED BY FAX

FIG.28A

| FAX HEADER (IMAGE.RUN-LENGTH FORMAT) |
|---|
| FAX IMAGE (IMAGE.RUN-LENGTH FORMAT) |

SIGNAL CONTENTS TRASFERRED FROM CS TO PAGER OF HANDHELD TERMINAL DEVICE

FIG.28B

| FAX HEADER (CHARACTER CODE.RECEIVED IMAGE IS CONVERTED THROUGH CHARACTER RECOGNITION) |
|---|

SIGNAL CONTENTS TRANSMITTED BY CS

FIG.28C

| FAX HEADER (IMAGE.RUN-LENGTH FORMAT) |
|---|
| FAX IMAGE (IMAGE. RUN-LENGTH FORMAT) |

FIG.29

| | MESSAGE TRANSMITTED FROM CS TO PAGER OF HANDHELD TERMINAL DEVICE |
|---|---|
| ① | FAX ARRIVAL MESSAGE (COMMAND) |
| ② | FAX TRANSMISSION MESSAGE (NAME,TEL NO.,etc.) |
| ③ | RECEIVE DATE AND TIME |
| ④ | CALL TEL NUMBER OF RECEIVED CS |
| ⑤ | ID OF RECEIVED CS |
| ⑥ | MANAGEMENT NUMBER OF FAX IMAGES AT CS |
| ⑦ | LENGTH OF RECEIVED FAX IMAGE DATA |
| ⑧ | HEADER CHARACTER OF RECEIVED FAX IMAGE DATA (THROUGH CHARACTER RECOGNITION OF HEADER) |

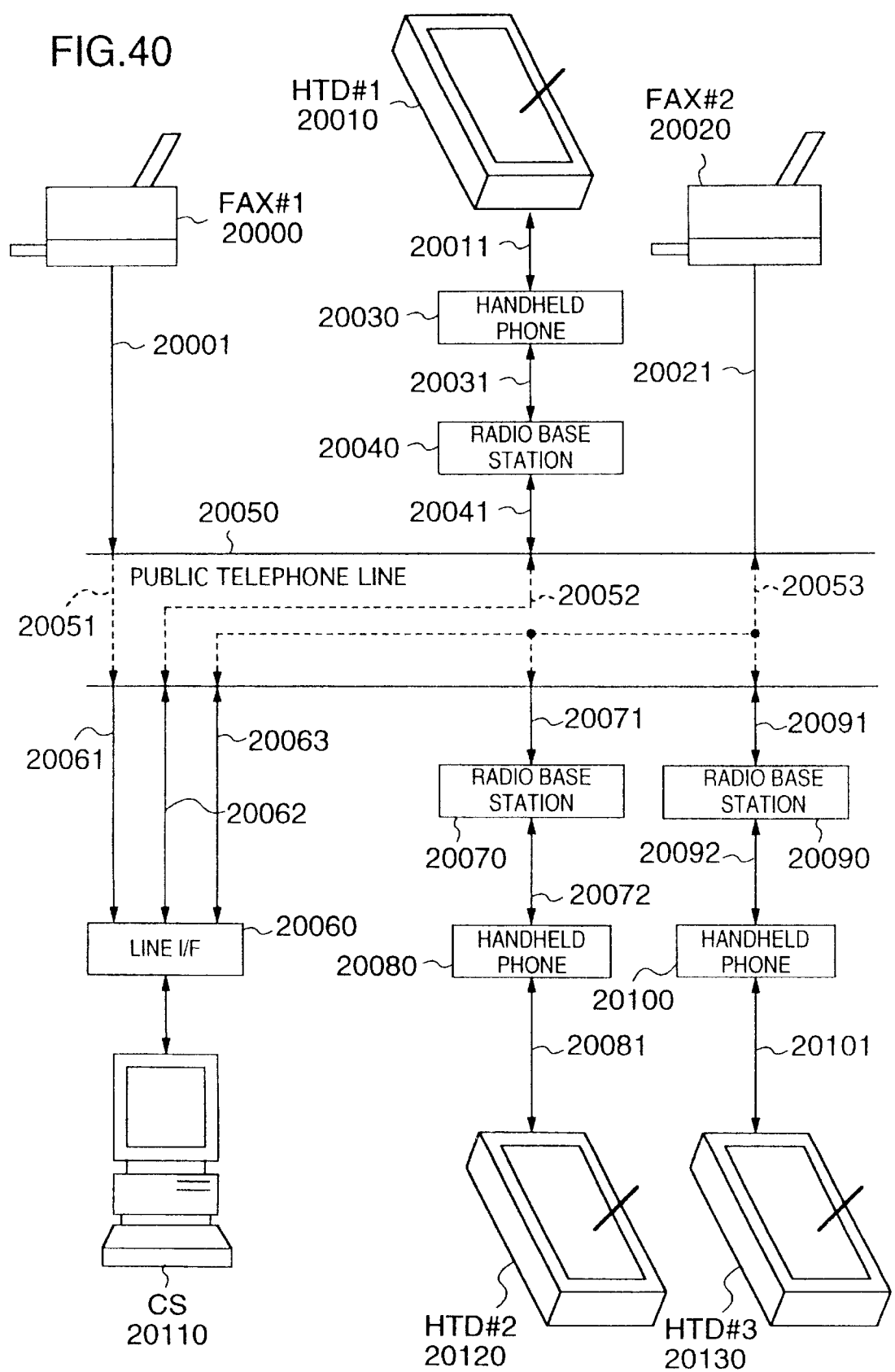

5,933,478

DATA TRANSFER SYSTEM AND HANDHELD TERMINAL DEVICE USED THEREFOR

BACKGROUND OF THE INVENTION

The present invention relates to a data transfer system, and more particularly to a data transfer system for quickly and reliably transferring necessary data to a handheld terminal device used at any location.

Recently message reception devices (pager) for radio call services are rapidly prevailing because these devices are relatively compact and low in cost. Exchange of electronic mails, data files, and the like via BBS (Bulletin Board System) is popular among personal computer communications, over Internet, and among other communications. Under such circumstances, services ("Electronic Mail Reception Notice Services" by NIFTY-Serve or NTT DoCoMo) are provided for promoting quick information exchange by automatically notifying the reception of electronic mail to a pager possessed by a user when mail to the user has been received at a BBS the user subscribes to.

The "Electronic Mail Reception Notice Services" notify the pager user only of the reception of electronic mail. Therefore, although the user can be notified of the reception of electronic mail, the contents of the mail cannot be known. Even if the user is informed earlier of the reception of electronic mail from the page the contents of the electronic mail cannot be known until the user connects to the host station of BBS and reads the contents of the electronic mail by using a personal computer at an office or home. Therefore, depending upon the circumstances when a user is informed of the reception of electronic mail, quick information exchange is not necessarily ensured.

Apart from pagers, facsimiles (hereinafter abbreviated as "FAX") are known as an apparatus for quickly and reliably transferring information, in the form of image data such as characters and graphics drawn on a sheet of paper, to remote sites by using public lines such as telephone lines. Generally, FAX is used for transferring image data to a fixed site. If a callee is out of his/her office and at a different location, FAX installed nearest to the callee is checked in accordance with the schedule of the callee, and the image data is sent to that FAX. In this case, if the callee moves to a place different from the initial schedule, the image data cannot be sent directly to the callee.

In order to deal with such circumstances, two types of FAXes "Bishamon [HF-TM1]" and "Bishamon [HFTB1]" manufactured and sold by the present assignee are provided with a memory reception function and a transfer function. When the two types of FAXes receive image data from another FAX, they store it in an internal memory instead of printing it out on a paper sheet, and thereafter notify the callee of the reception of the image data by calling "pager" always carried by a callee of the FAXes. When the callee is informed of the reception of the image data by the pager, the callee uses another FAX installed nearby to connect to his/her own FAX, to remote-control it through the tone dial, and to have the image data stored in the internal memory sent to the callee via the nearby FAX. In this manner, the contents of the received image data can be known quickly, and the caller who sent information over a FAX does not necessarily have to pay attention to the schedule and present location of the callee.

However, even with these two types of FAXes, the contents of image data cannot be known quickly unless there is a FAX near the callee who is informed of the reception of the image data by a pager. Furthermore, since the contents notified by the pager regard only the reception of image data, it is impossible to judge beforehand whether the contents of the image data should be read at once because they are important. Assuming that a callee is waiting for information regarding a very important issue and there is a call from the pager, the callee intercepts its work and finds a nearby FAX to perform an image data transfer operation described above, even if the contents of the image data are information regarding an issue not so important.

Low power consumption of a handheld or portable phone in combination with a pager is disclosed in JP-A-6-6302 and JP-A-6-97877.

SUMMARY OF THE INVENTION

It is an object of the present invention to provide a data transfer system and a handheld terminal device wherein when a callee is informed of the reception of data from its handheld terminal device, the callee can immediately check the contents of the received data on site.

The above object is achieved by arrival data acquisition means (e.g., an arrival data acquisition processing 500 in FIG. 11) of a preferred handheld terminal device with the communication function of this invention. This means receives a new arrival message indicating the reception of new data and automatically controls an acquisition processing of the data in accordance with the contents of the new arrival message.

The new arrival message may contain data identifier information for identifying the data (e.g., a file ID 211 shown in FIG. 4). In this case, the arrival data acquisition controlling means includes a new arrival message analysis processing unit for analyzing the received new arrival message and deriving the data identifier information (e.g., a command analysis at Step 501 of an arrival data acquisition processing 500) and a received data transmission controlling unit for controlling a transmission process of the data in accordance with the data identifier information (e.g., a file fetch processing at Step 510 of the received data acquisition processing 500).

The arrival message may contain data identifier information for identifying the data and connection information for accessing the data (e.g., a telephone number 212 shown in FIG. 4). In this case, the received data acquisition controlling means includes a new arrival message analysis processing unit for analyzing the received new arrival message and deriving the data identifier information and the connection information, a connection establishment processing unit for performing connection processing of a communication line in accordance with the connection information (e.g., a line connection 511 shown in FIG. 12), and a received data transmission controlling unit for controlling transmission processing of the data in accordance with the data identifier information.

The handheld terminal device may be provided with a retry control unit for controlling the connection establishment processing unit to repetitively perform communication line connection processing, until a predetermined number of retries are carried out or a communication line is established.

The handheld terminal device may be provided with a user confirmation processing unit for allowing the user to determine whether an acquisition processing for the data is to be performed or not (e.g., user confirmation 515 shown in FIGS. 12 and 16). In this case, the received data acquisition controlling means controls the acquisition processing for the data in accordance with an instruction from the user confirmation processing unit.

The new arrival message may contain data size information indicating the size of the data. In this case, the received data acquisition controlling means controls an acquisition processing for the data in accordance with an empty capacity of a data storage area of the handheld terminal device and the data size information.

The connection establishment processing unit preferably performs connection processing of a communication line in connection with a handheld phone.

A preferred data transfer system of this invention has a host computer and at least one handheld terminal device with a communication function. The host computer comprises a new arrival message transmission controlling unit for performing transmission control for transmitting a new arrival message, the new arrival message includes data identifier information for identifying new arrival data and connection information for accessing the received data (e.g. an new arrival data file message transmission processing 650 shown in FIG. 8), and a host side received data transmission control unit for controlling reception processing of receiving a transmission request message and a transmission processing of transmitting the received data identified by the transmission request message (e.g., a host main processing 600 shown in FIG. 10). The handheld terminal device comprises a new arrival message analysis processing unit for analyzing the newly received arrival message and deriving the data identifier information and the connection information, a connection establishment processing unit for performing connection processing of a communication line to the host computer in accordance with the connection information, and a terminal side received data transmission control unit for controlling transmission processing of transmitting the transmission request message in accordance with the data identifier information and reception processing of receiving the received data transmitted from the host computer.

The host side received data transmission control unit may perform the transmission processing of the same data to a plurality of handheld terminal devices simultaneously.

The handheld terminal device may be equipped with a retry control unit for controlling the connection establishment processing unit to repetitively perform the communication line connection processing, until a predetermined number of retries are carried out or a communication line is established.

The connection establishment processing unit preferably performs the communication line connection processing by radio or a wired telephone line.

In a preferred handheld terminal device of this invention, new data directed to a user is automatically fetched by the handheld terminal device with the communication function possessed by the user. It is therefore possible for the user to confirm the contents of the data at once and exchange information quickly.

Since the new arrival message may contain the data identifier information for identifying the received data, the user can perform a proper transmission processing in accordance with, for example, the type of data (e.g., electronic mail, data file) and the contents of data (e.g., priority, degree of urgency, necessary or unnecessary response).

Since the new arrival message may contain the data identifier information for identifying the received data and the connection information for accessing the data, it is not necessary to hold or search the connection information required for the data acquisition. Therefore, the transmission processing can be made efficiently and proper transmission processing can be performed in accordance with the data type and contents.

Since retry connection processing may be performed automatically if a communication line cannot be established at one connection processing, the processing of acquiring data can be simplified.

Since the user confirmation processing unit for allowing a user to determine whether the data acquisition processing is performed or not may be equipped, the data acquisition processing can be selected as desired depending upon user circumstances of the user.

Since the new arrival message may contain the data size information indicating the size of the received data, a proper processing (e.g., suspension of data acquisition, acquisition of only data header portion, and the like) can be performed if the empty space of a data storage area is insufficient for storing the received data.

The connection establishment processing unit preferably performs the connection processing to a communication line by using a handheld phone. Therefore, it is not necessary to perform a troublesome preparatory work such as connecting the handheld terminal device to a public telephone line by using cables and modems. In addition, the contents of data can be confirmed at once and the information exchange can be carried out quickly only if a user is in the handheld phone service area.

New data directed to a subscriber to a BBS managed by the host computer can be automatically transmitted to the handheld terminal device with the communication function possessed by the user, by performing transmission processing suitable for the type of the received data (e.g. electronic mail, data file) and the contents of the received data (e.g., priority, degree of urgency, necessary or unnecessary response). Therefore, the user can confirm the data contents at once and the information exchange can be performed quickly.

The host side received data transmission control unit may perform the transmission processing of the same data to a plurality of handheld terminal devices with the communication function simultaneously. Therefore, information of the same contents can be supplied to a plurality of users efficiently.

Even if a communication line cannot be established by one connection processing, the retry connection processing is performed automatically. Therefore, the processing to be executed for the data acquisition by the handheld terminal device with the communication function can be simplified.

The connection establishment processing unit performs a connection processing of a communication line by radio or a wired telephone line. Therefore, the data contents can be confirmed quickly and rapid information exchange is possible only if the user is in the handheld phone service area or in an area connectable to cables.

Further, the above object of the invention can be achieved by a preferred data transfer system which comprises at least one handheld terminal device for generating, storing, and displaying data to be transmitted and received, the handheld terminal device having connection means for connecting to a public telephone line and data transmission control means for controlling transmission/reception of data transmitted and received via the public telephone line, and a communication server for storing received transmission data, the communication server having connection means for connecting to the public telephone line and data transmission control means for controlling transmission/reception of data transmitted and received via the public telephone line. The communication server sends a message indicating reception of the transmission data to the handheld terminal device designated by the transmission data, and in response to a transmission data transfer request from the handheld terminal device, transmits the transmission data via the public telephone line.

In a preferred data transfer system of this invention, the communication server stores the received transmission data. The communication server also sends a message indicating reception of the transmission data to the handheld terminal device designated by the transmission data, and in response to the transmission data transfer request from the handheld terminal device, transmits the transmission data via the public telephone line.

With this arrangement in mind, consider the case wherein FAX image data is used as the transmission data. When an originating Station transmits FAX image data to the communication server, the telephone number of the communication server and the ID number of the destination handheld terminal device are also transmitted. The communication server stores the received FAX image data in a large capacity storage medium, and thereafter transmits a FAX arrival message to a pager connected to the destination handheld terminal device. In this case, the brief contents of the FAX image data are added to the message. Immediately after the user is informed of a FAX arrival by referring to the message received by the pager, the user can confirm the brief contents immediately on site.

In accordance with the priority level of the received FAX image data, or when the handheld phone of the handheld terminal device becomes usable, the user sends a transfer request for the image data to the communication server via the handheld phone of the handheld terminal device. In this manner, all or part of the image data stored in the storage medium of the communication server can be fetched and displayed at the destination handheld terminal device. If necessary, the reception side may instruct, from the handheld terminal device, the communication server to transfer the image data stored in the storage medium of the communication server to another handheld terminal device or another FAX.

BRIEF DESCRIPTION OF THE DRAWINGS

FIG. 25 is a diagram showing examples of the contents of transmission data to be transmitted from FAX to a handheld terminal device via a communication server.

FIG. 26 is a diagram showing other examples of the contents of transmission data to be transmitted from FAX to a handheld terminal device via a communication server.

FIG. 27 shows the detailed transmission data shown in FIG. 26.

FIGS. 28A to 28C show examples of the format of a message to be transmitted from a communication server to a handheld terminal device.

FIG. 29 is a diagram showing examples of the contents of a message to be transmitted from a communication server to a handheld terminal device.

FIG. 40 is a block diagram showing the overall structure of a data transfer system wherein FAX image data transmitted to a handheld terminal device is transmitted to another handheld terminal device or another FAX, according to still another embodiment of the invention.

FIGS. 41A and 41B illustrate examples of how a restriction on the data transfer system caused by a handheld terminal device is dealt with.

FIG. 42 illustrates another example of how a restriction on the data transfer system caused by a handheld terminal device is dealt with.

DETAILED DESCRIPTION OF THE PREFERRED EMBODIMENTS

Embodiments of an automatic data transfer system of this invention will be described with reference to the accompanying drawings.

Figure 1:
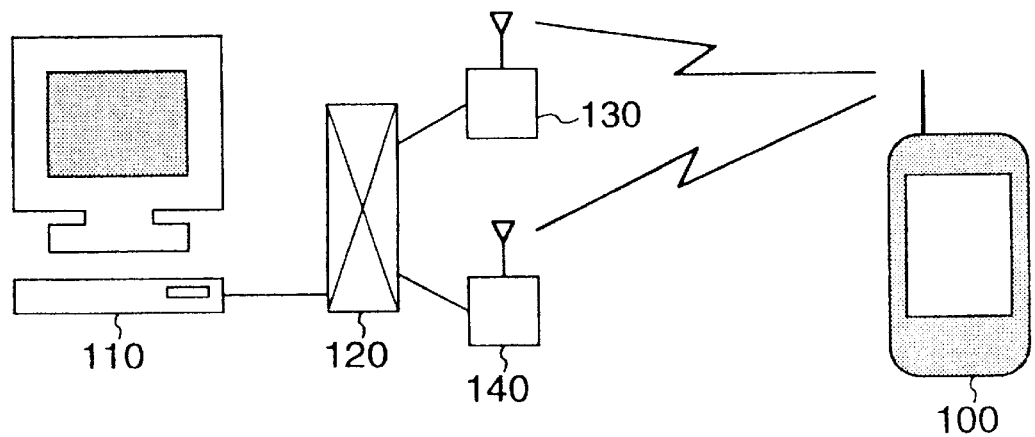
FIG. 1 is a diagram showing the outline of the whole structure of an automatic data transfer system of this invention.

FIG. 1 is a diagram showing the outline of the whole structure of an automatic data transfer system of this invention. In FIG. 1, numeral 100 represents a handheld terminal device (corresponding to "a handheld terminal device with a communication function" cited in the appended claims), numeral 110 represents a host computer for the communication with the handheld terminal device, numeral 120 represents a public telephone line, numeral 130 represents a base station for transmitting a message to the handheld terminal device 100 over radio waves, and numeral 140 represents a handheld phone base station for the communication with the handheld terminal device 100 over radio waves.

The host computer 110 transmits a message ("new arrival message" in appended claims) to the handheld terminal device 100 via the base station 130. This message contains an identifier of a file (or electronic mail, corresponding to "data" in appended claims) to be fetched by the handheld terminal device 100. Upon reception of the message, the handheld terminal device 100 performs data communications with the host computer 110 by using a handheld phone function thereof, and fetches the file (or electronic mail) designated by the message.

Figure 2:
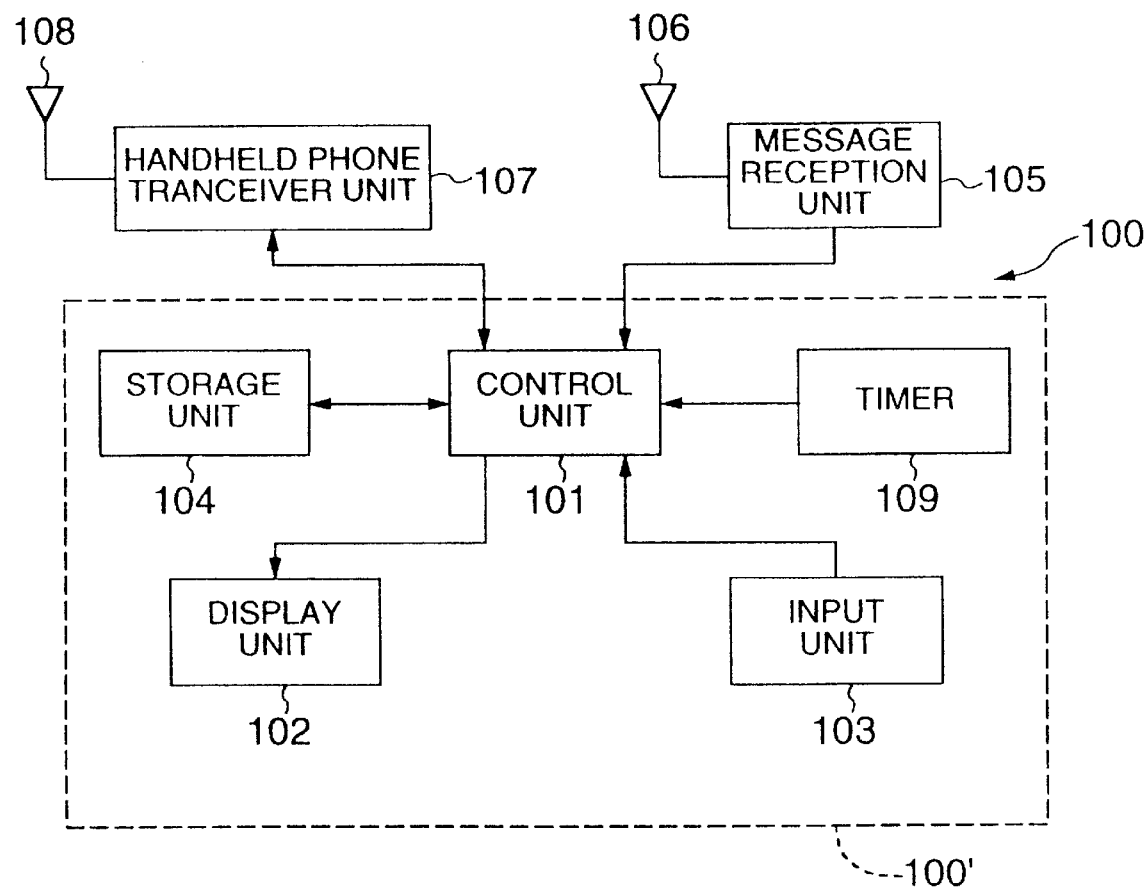
FIG. 2 is a block diagram showing an example of the internal structure of a handheld terminal device with a communication function.

FIG. 2 is a block diagram showing an example of the internal structure of the handheld terminal device 100 with a communication function shown in FIG. 1. In FIG. 2, numeral 101 represents a control unit for controlling the execution of various programs regarding peripheral control, a data request and processing, communications, and the like. Numeral 102 represents a display unit including, for example, an LCD (Liquid Crystal Display) unit and a driver for driving the LCD unit. Instead of the LCD unit of the display unit 102, a CRT (Cathode Ray Tube) unit may be used. Numeral 10 3 represents an input unit such as a tablet serving also as a display panel. Numeral 104 represents a storage unit which may be a RAM, a ROM, a flash memory, or a hard disk. Numeral 105 represents a message reception unit such as a pager. The message reception unit 105 receives a message transmitted from the host computer via the base station 130 shown in FIG. 1. Numeral 106 represents an antenna from which a message is received. Numeral 107 represents a handheld phone transceiver unit which performs data communication with the host computer via the handheld phone base station 140 shown in FIG. 1. The handheld phone transceiver unit 107 is, for example, a cellular phone or PHS (Personal Handyphone System). Numeral 108 represents an antenna of the handheld phone transceiver unit 106. Numeral 109 represents a timer for time management.

Although in this structure, the message reception unit 105 and the handheld phone transceiver unit 107 are independent and separate units, they may be combined in a single unit by giving the same function as the message reception unit to the handheld phone transceiver unit.

Furthermore, if a commercially available pager itself has output terminals for a call signal and a message signal, the commercially available pager or handheld phone can be used as the message reception unit 105 and handheld phone transceiver unit 107. In this case, the structure of this invention is shown by the circuit portion indicated by a broken line in FIG. 2.

Figure 3:
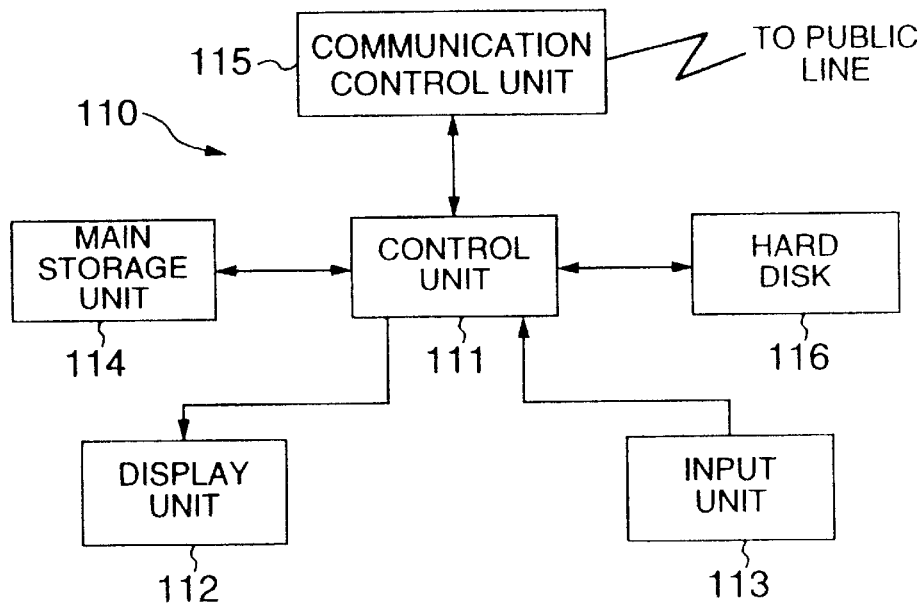
FIG. 3 is a block diagram showing an example of the internal structure of the host computer shown in FIG. 1.

FIG. 3 is a block diagram showing an example of the internal structure of the host computer 110 shown in FIG. 1. In FIG. 3, numeral 111 represents a control unit for controlling the execution of various programs regarding peripheral control, a data request and process, communications, and the like. Numeral 112 represents a display unit including, for example, an LCD (Liquid Crystal Display) unit and a driver for driving the LCD unit. Instead of the LCD unit of the display unit 102, a CRT (Cathode Ray Tube) unit may be used. Numeral 113 represents an input unit such as a keyboard and a mouse. Numeral 114 represents a main storage unit which may be a RAM or a ROM. Numeral 115 represents a communication control unit for controlling the message transmission to the handheld terminal device and the data communications with the handheld terminal device. Numeral 116 represents a hard disk for storing data such as electronic mail and files.

In the system described with FIGS. 1 to 3, a processing (corresponding to "a data acquisition processing" cited in appended claims) to be performed by the handheld terminal device 100 for automatically fetching a file (or electronic mail) from the host computer 110 will be described in detail.

Figure 4:
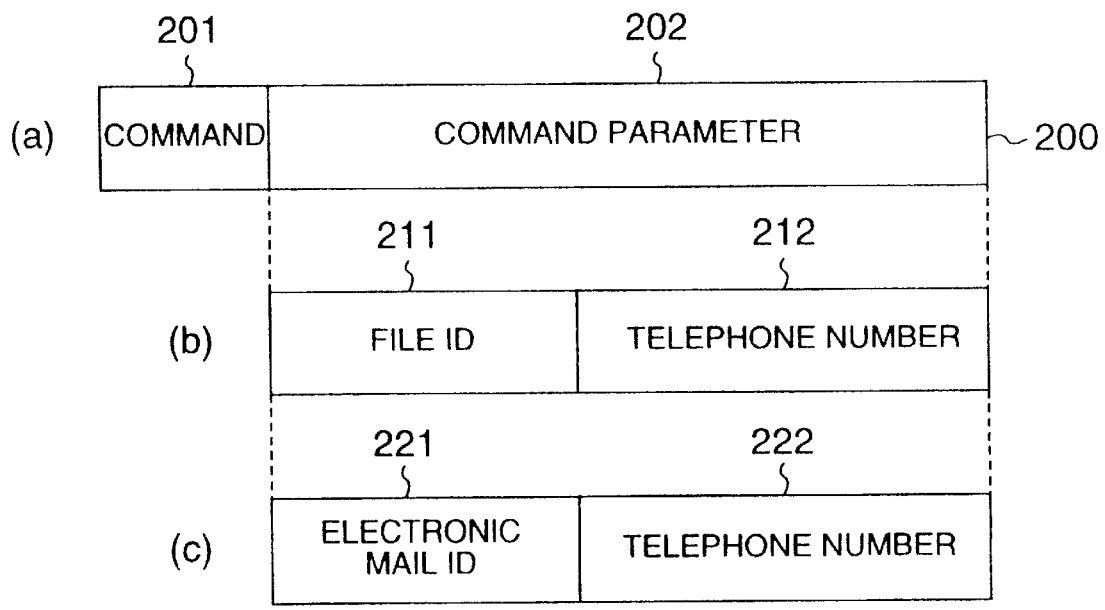
FIG. 4 shows examples of the formats of a new arrival message to be transferred in the automatic data transfer system of the invention.

FIG. 4 shows examples of the format of a new arrival message to be transferred in the automatic data transfer system of this invention. In FIG. 4, FIG. 4(a) shows the format of a message 200 to be transmitted from the host computer 110 to the handheld terminal device 100. Either a "new file arrival notice command or an "new electronic main arrival notice" command is set as a command 201. Parameters specific to the command 201 are set to a command parameter 202. FIG. 4(b) shows parameters for the "new file arrival notice command, numeral 211 represents an identifier (file ID) of a new file arrival to be fetched, and numeral 212 represents a telephone number of the host computer 110 in which the file is stored. FIG. 4(c) shows parameters for the "electronic mail new arrival notice" command, numeral 221 represents an identifier (electronic mail ID) of a new arrival electronic mail to be fetched, and numeral 222 represents a telephone number of the host computer 110 in which the electronic mail is stored. In this embodiment, the file ID and electronic mail ID are shown as the parameters. It is obvious that identifiers of the types of data may also be used. For example, an identifier of graphics data and an identifier of facsimile data may also be used.

Figure 5:
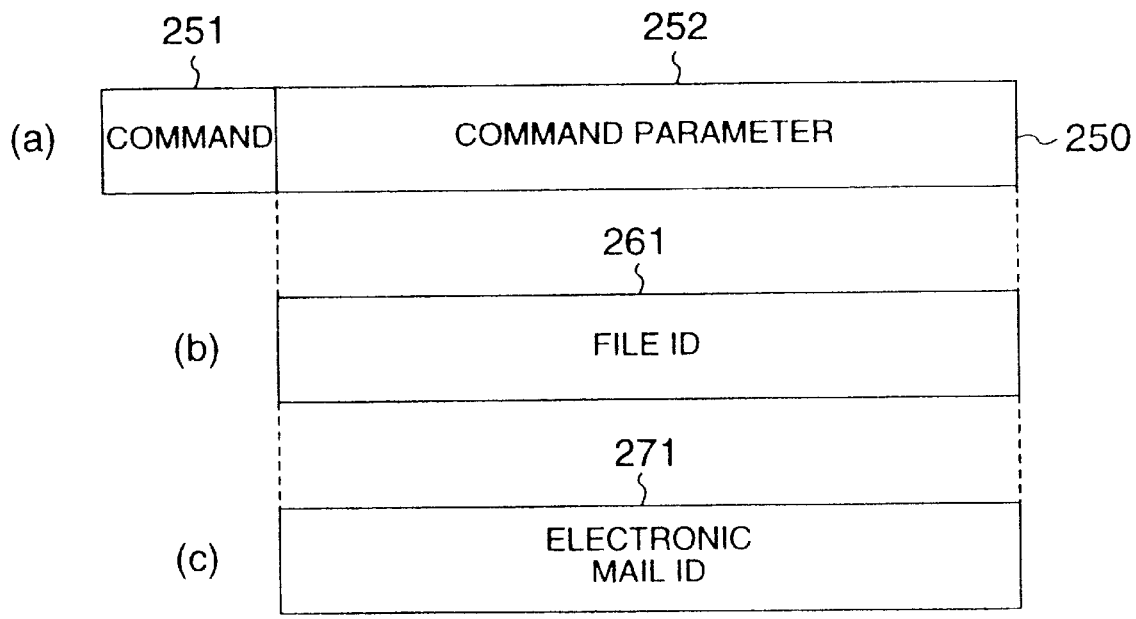
FIG. 5 shows examples of the formats of a transmission request message to be transferred in the automatic data transfer system of the invention.

FIG. 5 shows examples of the format of a transmission request message to be transferred in the automatic data transfer system of this invention. In FIG. 5, FIG. 5(a) shows the format of a message 250 to be transmitted from the handheld terminal device 100 to the host computer 110. Either a "file fetch request" command or an "electronic mail fetch request" command is set to a command 251. Parameters specific to the command 251 are set to a command parameter 252. FIG. 5(b) shows a parameter for the "file fetch request" command, and numeral 261 represents an identifier (file ID) of the file to be fetched. FIG. 5(c) shows a parameter for the "electronic mail fetch request" command, and numeral 271 represents an identifier (electronic mail ID) of the electronic mail to be fetched.

Figure 6:
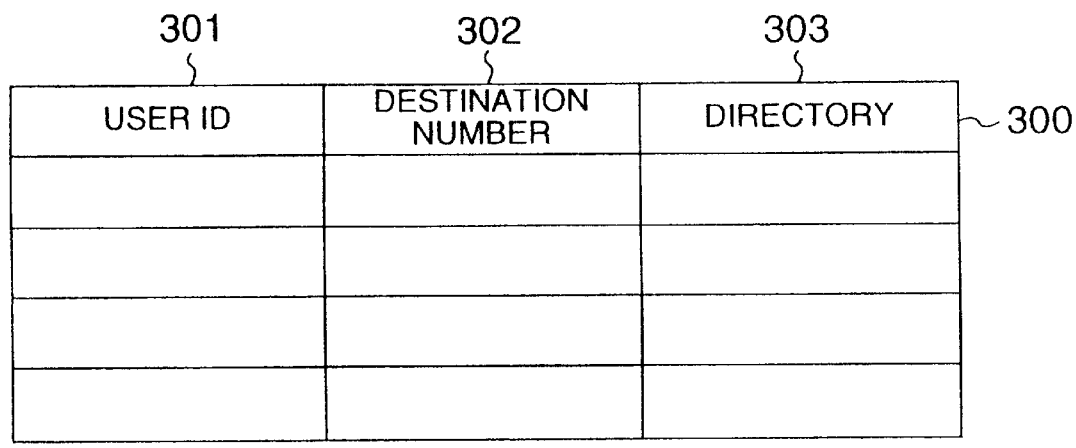
FIG. 6 shows an example of the structure of a destination management table for managing users having a handheld terminal device with a communication function, at the host computer shown in FIG. 3.

FIG. 6 is a diagram showing an example of the format of a destination management table for managing a user of the handheld terminal device with the communication function at the host computer shown in FIG. 3. In FIG. 6, a destination management table 300 includes a user ID 301, a destination number 302, and a directory name 303. Stored in the user ID 301 is the identifier of each user having a handheld terminal device. Stored in the destination number 302 is a telephone number used when transmitting a message 200 to the handheld terminal device possessed by the user identified by the user ID 301 (more specifically, to the message reception unit (pager) 105). Stored in the directory name 303 is a directory name of a file to be transmitted to the handheld terminal device possessed by the user identified by the user ID 301. In this embodiment, it is assumed that a file management system of a hierarchical structure is utilized for efficiently managing files in the hard disk 116 shown in FIG. 3.

Figure 7:
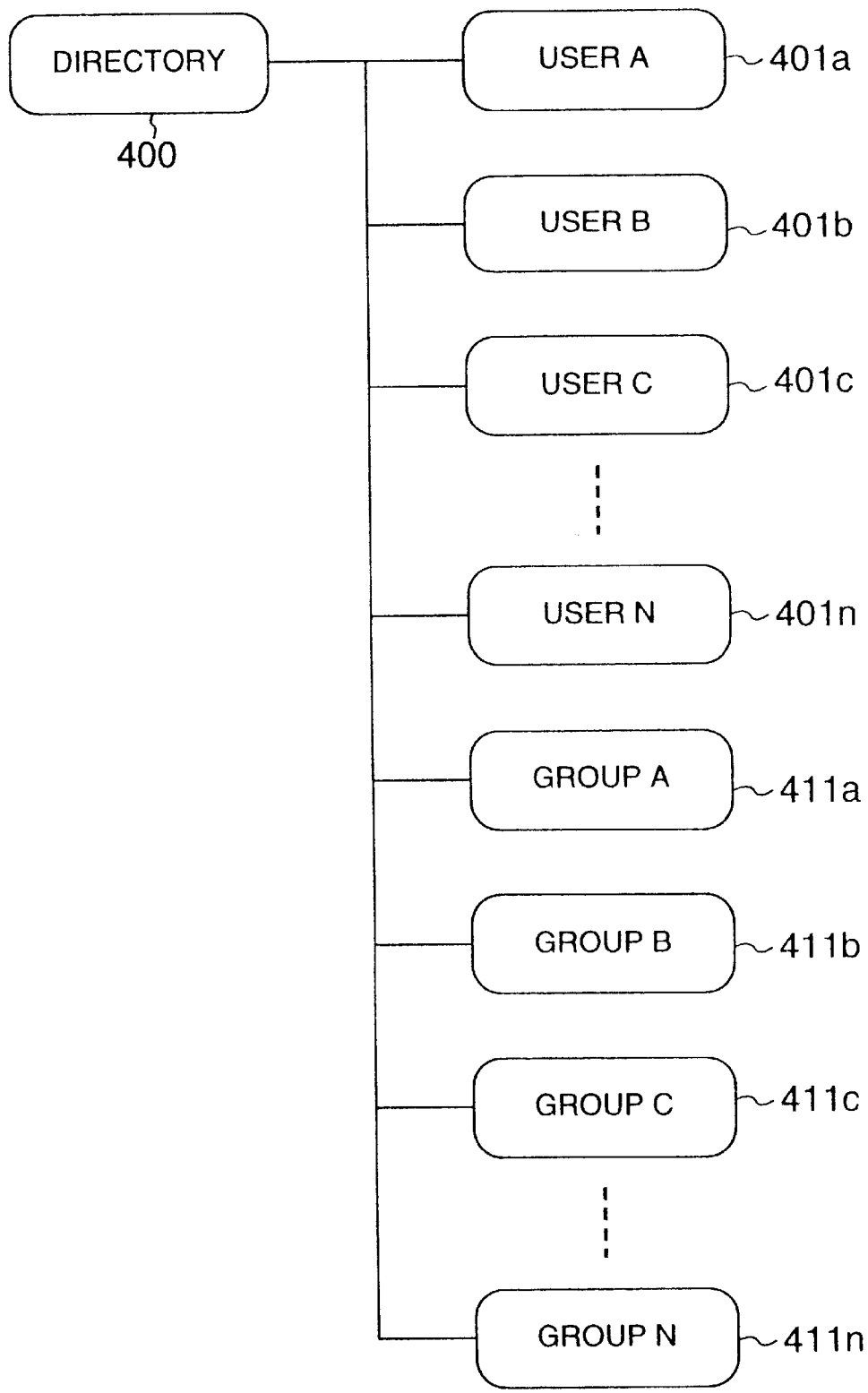
FIG. 7 shows an example of the structure of a directory for managing data files to be transferred at the host computer shown in FIG. 3.

FIG. 7 is a diagram showing an example of a directory structure for managing data files to be transmitted at the host computer shown in FIG. 3. Referring to FIG. 7, the hard disk 116 of the host computer 110 stores a directory 400 for managing files to be fetched by the handheld terminal devices 100. This directory 400 has as its lower levels many directories 401a, 401b, . . . , 401n for managing files of each user to be transmitted.

Figure 8:
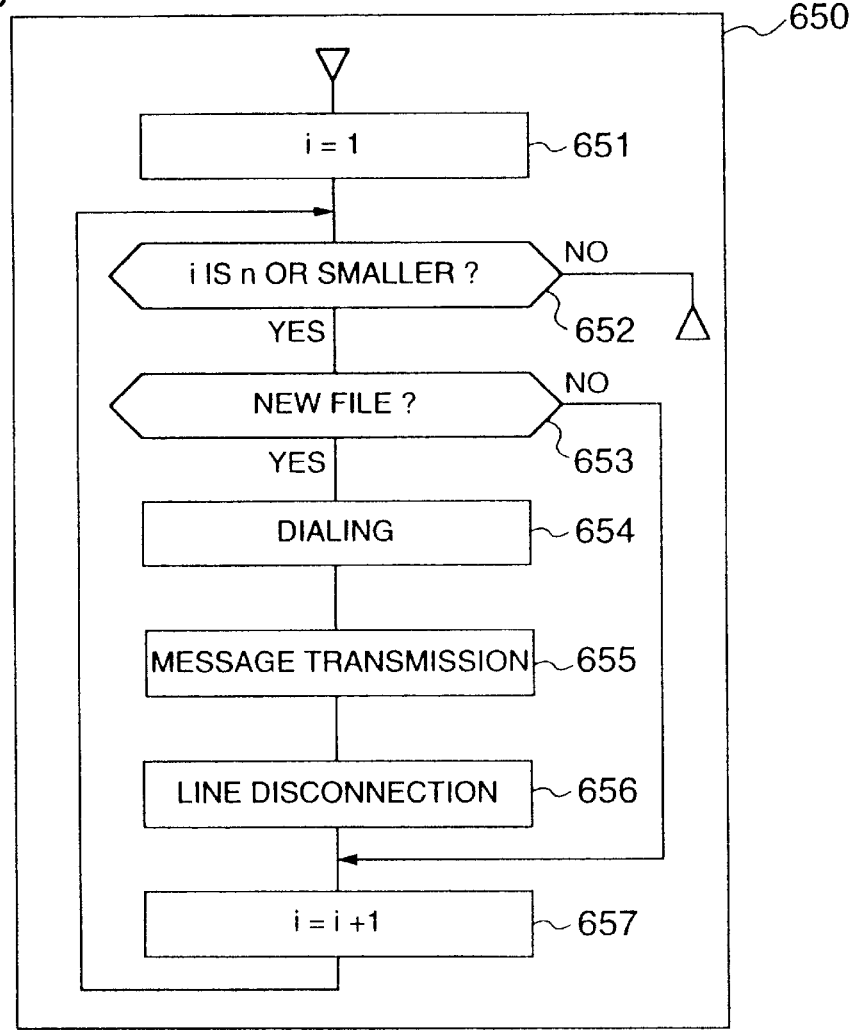
FIG. 8 is a flow chart illustrating the outline of a data file new arrival message processing to be executed by the host computer shown in FIG. 3.

FIG. 8 is a flow chart illustrating the outline of a new data file arrival message process to be executed by the host computer shown in FIG. 3. This transmission processing 650 is activated periodically or irregularly. In the following example, it is assumed that the number of users to be managed by the destination management table is n.

In the new data file arrival message transmission processing 650 illustrated in FIG. 8, a variable i for identifying a record in the user management table 300 is initialized to i=1 (Step 651). Next, it is checked whether i is n or smaller (Step 652), and if i is larger than n, the new data file arrival message transmission processing 650 is terminated. If i is n or smaller, it is checked whether a new file is registered in a directory 401i designated by the directory name 303 stored in the i-the record of the destination management table 300 shown in FIG. 6 (Step 653), and if a new file is not stored therein, the processing branches to Step 657 without performing any operation.

On the contrary, if a new file is stored therein, the host computer dials, via the communication control unit 115 shown in FIG. 3, the destination number 302 registered in the i-the record of the destination management table 300 (Step 654). The "new file arrival notice" command is set to the command 201, and a file ID 211 for identifying the new file found at Step 653 and a telephone number 212 for the access to the host computer 110 are set to the command parameter 202. A new arrival message 200 obtained by these settings is transmitted to the handheld terminal device 100 (Step 655), and thereafter the telephone line is disconnected (Step 656). At Step 657, the value of i is incremented by 1. With the above processing, the new arrival message 200 containing the "new file arrival notice" command can be transmitted to the handheld terminal device 100.

In the automatic data transfer system of this invention, by using a pager's broadcast function (function of calling a plurality of pagers by a single telephone number), a plurality of users can be informed at one time to fetch the same file. To this end, in the destination management table 300 shown in FIG. 6, a group ID is stored in advance in the user ID 301 and a directory name storing a file to be transmitted to the group member identified by the user ID 301 is stored in advance in the directory name 303. For the management of files to be transmitted, directories 411a, 411b, . . . , 411n for respective groups are stored in the transfer file storage directory 400 of the hard disk 106 at the host computer 110. With this arrangement, the new data file arrival message transmission processing 650 can call a plurality of users in the same group by transmitting a single group ID. It is therefore possible to simultaneously notify a plurality of users that the same file can be fetched.

Figure 9:
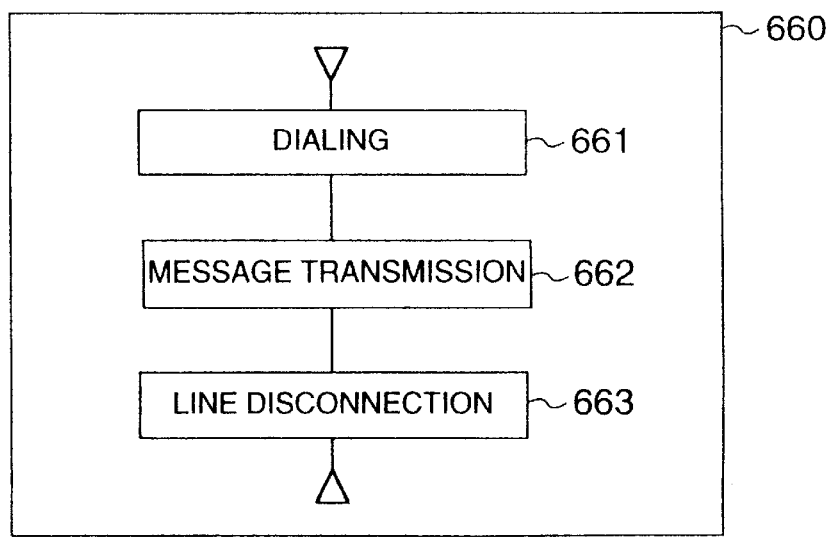
FIG. 9 is a flow chart illustrating the outline of an electronic mail new arrival message to be executed by the host computer shown in FIG. 3.

FIG. 9 is a flow chart illustrating the outline of a new electronic mail arrival message transmission processing to be executed by the host computer shown in FIG. 3. This transmission processing 660 is activated when new electronic mail reaches the host computer 110.

In the electronic mail new arrival message transmission processing 660 shown in FIG. 9, the host computer dials, via the communication control unit 115 shown in FIG. 3, the destination number 302 stored in a record of the destination management table 300 corresponding to the user to which the new electronic mail was directed (Step 661). The new electronic mail arrival notice" command is set to the command 201, and an electronic mail ID 221 for identifying the new arrival electronic mail and a telephone number 222 for the access to the host computer 110 are set to the command parameter 202. A new arrival message 200 obtained by these settings is transmitted to the handheld terminal device 100 (Step 662) and thereafter the telephone line is disconnected (Step 663).

With the above processings made by the host computer 110, it is possible to instruct each handheld terminal device 100 to fetch a file or electronic mail.

Figure 10:
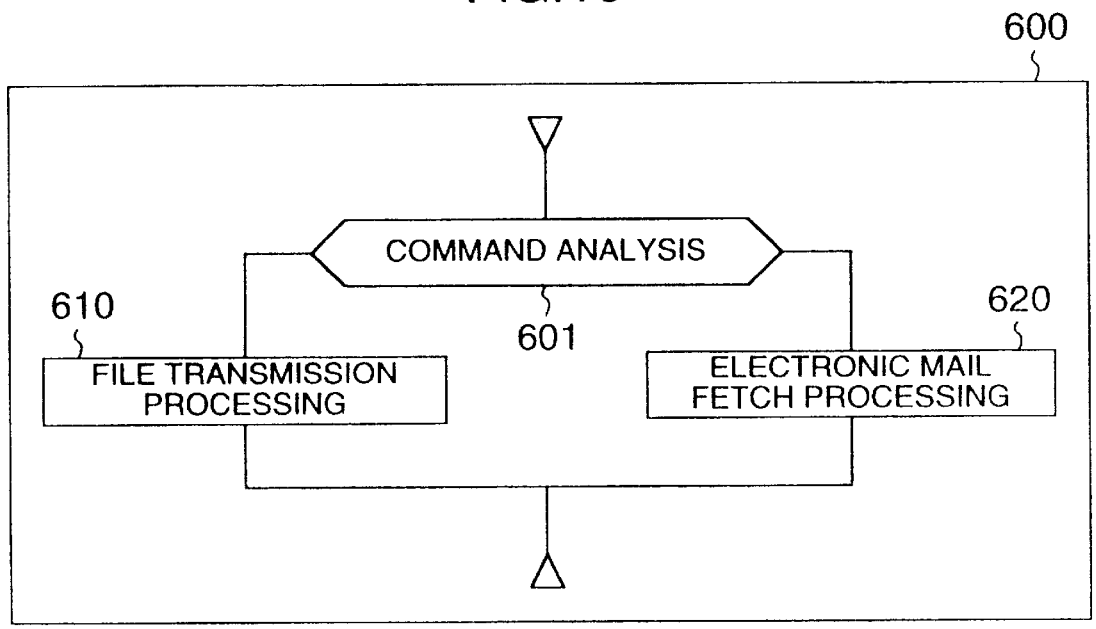
FIG. 10 is a flow chart illustrating the outline of host main processing to be executed by the host computer shown in FIG. 3.
Figure 11:
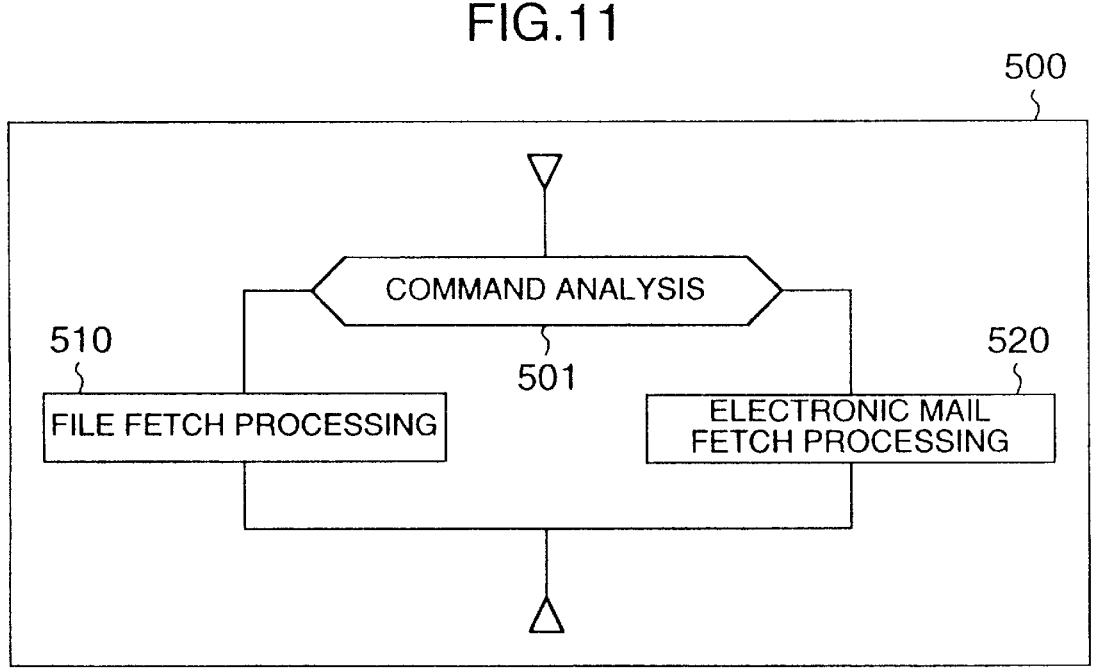
FIG. 11 is a flow chart illustrating the outline of data acquisition processing to be executed by the handheld terminal device with the communication function shown in FIG. 2.

In order for each handheld terminal device to automatically fetch a file or electronic mail in response to a message 200 transmitted from the host computer 110 during the new arrival message transmission processing, the handheld terminal device 100 executes a transfer request message transmission processing 500 illustrated in FIG. 11 whereas the host computer 110 executes a host main processing 600 (corresponding to "data transmission processing" in appended claims) illustrated in FIG. 10. These processings will be described.

FIG. 10 is a flow chart illustrating the outline of the host main processing to be executed by the host computer shown in FIG. 3. This host main processing is activated when the telephone line to the handheld terminal device is connected. In this embodiment, in order to establish a file transfer between the handheld terminal device 100 and host computer 110, a known XMODEM protocol is used. File transfer protocols other than XMODEM may also be used. The details of XMODEM and other file transfer protocols are described in "Transistor Technologies Computer, Vol. 5, Issue 7, pp. 84–92, July, 1993".

Referring to FIG. 10, when the host main processing 600 is activated, a transfer request message 250 (see FIG. 5) sent from the handheld terminal device 100 is analyzed, and the processing is branched in accordance with the contents of the command 251 set in the message 250 (Step 601). Specifically, if the contents of the command 251 indicate the "file fetch request" command, file transmission processing 610 is executed. If the contents of the command 251 indicate the "electronic mail fetch request" command, electronic mail transmission processing 620 is executed. In the file transmission processing 610, a file designated by the file ID 261 in the transfer request message 250 received at Step 601 is transmitted to the handheld terminal device 100 by the XMODEM protocol. In the electronic mail transmission processing 620, an electronic mail designated by the electronic mail ID 271 in the transfer request message 250 received at Step 601 is transmitted to the handheld terminal device 100 by the XMODEM protocol.

FIG. 11 is a flow chart illustrating the outline of data acquisition processing to be executed by the handheld terminal device with the communication function shown in FIG. 2. This data acquisition processing 500 is activated when the message reception unit 105 shown in FIG. 2 receives the new data file arrival message from the host computer 110. Referring to FIG. 11, when the data acquisition processing 500 is activated, the new arrival message 200 (see FIG. 4) received from the host computer 110 is analyzed to branch the processing in accordance with the contents of the command 201 in the message 200 (Step 501). Specifically, if the contents of the command 201 indicate the "new file arrival notice" command, a file fetch processing 510 is executed, and if the contents of the command 201 indicate the "new electronic mail arrival notice" message, an electronic mail fetch processing 520 is executed.

Figure 12:
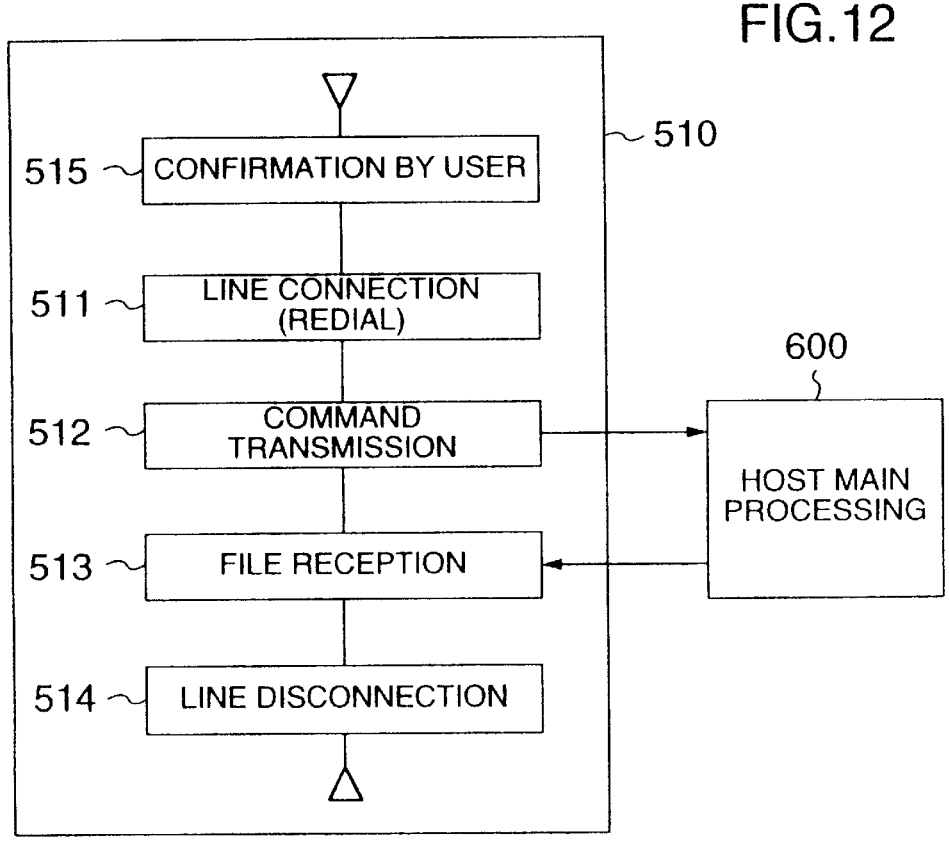
FIG. 12 is a flow chart illustrating an example of data file fetch processing under the automatic data file transfer control, to be executed by the handheld terminal device with the communication function shown in FIG. 2.
Figure 13:
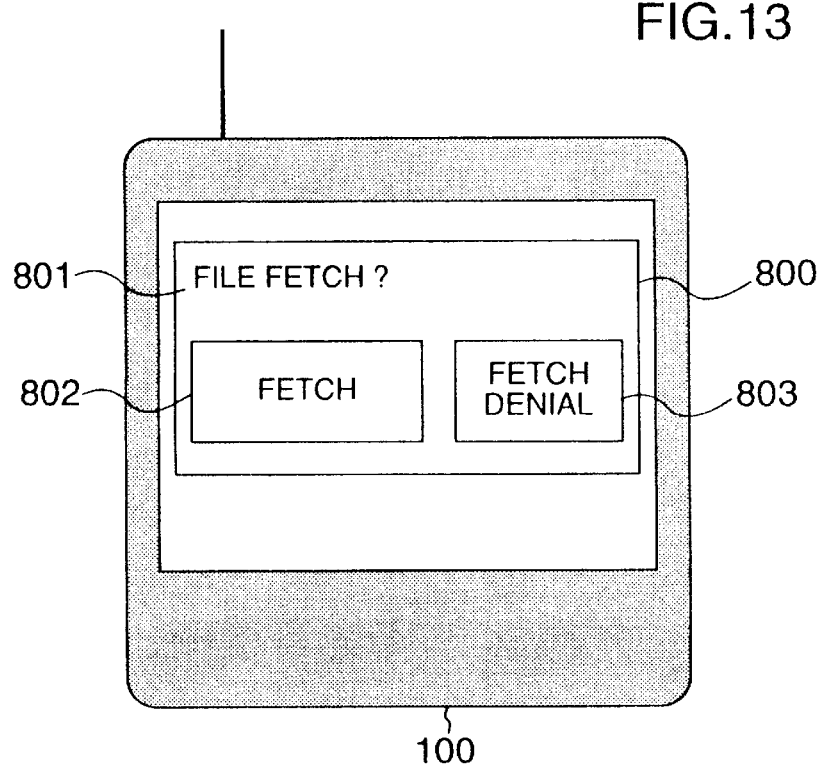
FIG. 13 shows a display example on the screen made by the processing illustrated in FIG. 12.

FIG. 12 is a flow chart illustrating an example of the file fetch processing to be executed by the handheld terminal device with the communication function shown in FIG. 2, under a data file automatic transfer control. Referring to FIG. 12, the characteristic feature of this embodiment is that a user is instructed to confirm whether the file is fetched or not (Step 515). FIG. 13 shows a display example on the screen for the confirmation by the user at the processing illustrated in FIG. 12. Numeral 800 represents a window for the confirmation of file fetch by the user, numeral 801 represents a file fetch confirmation message, numeral 802 represents a fetch button, and numeral 803 represents a fetch denial button. Such a display operation is performed when the control unit 101 of the handheld terminal device 100 shown in FIG. 2 executes a program stored in the storage unit 104.

If the user instructs a fetch denial at Step 515 (if the fetch denial button 803 is depressed), the process is terminated. If the user instructs a data fetch (if the data fetch button 802 is depressed), the telephone number 212 contained in the new arrival message 200 is first read and the handheld phone transceiver unit 107 redials this number 212 to establish a line connection to the host computer 110 (Step 511).

A transfer request message 250 is transmitted via the line connected at Step 511 to the host computer 110 (Step 512). The transfer request message 250 is formed by setting the "file fetch request" command to the command 251 and by setting a file ID 261 designated by the new arrival message 200 and identifying the new file to the command parameter 252. The file is then received from the host computer 110 by using the XMODEM protocol (Step 513). After the file is received, the telephone line connected at Step 511 is disconnected (Step 514).

In this embodiment, although confirmation by a user is performed prior to fetching a file, it may be arranged to fetch a file without user confirmation. In this case Step 515 is deleted and the file fetch processing 510 starts from Step 511.

In the processing of this embodiment, if the line connection is not established at Step 511, it may be arranged to automatically redial thereafter. Disability of establishing a line connection may be caused by either of (1) a busy state of the line and (2) an absence of the user. In the case of the busy state (1), the telephone line is disconnected once, a lapse time is monitored by the timer 109, and after a predetermined time lapse (e.g., one minute) the processing restarts from Step 511. In the case of the absence of the user (2), a time lapse after the start of Step 511 is monitored by using the timer 109, and if a predetermined time lapses (e.g., if one minute lapses), a telephone call is stopped. Thereafter, a lapse time is again monitored by using the timer 109, and after a predetermined time lapse (e.g., one minute), the processing restarts from Step 511. If the handheld terminal device 100 is given such functions, an automatic redial is possible when the line connection is not established.

Figure 14:
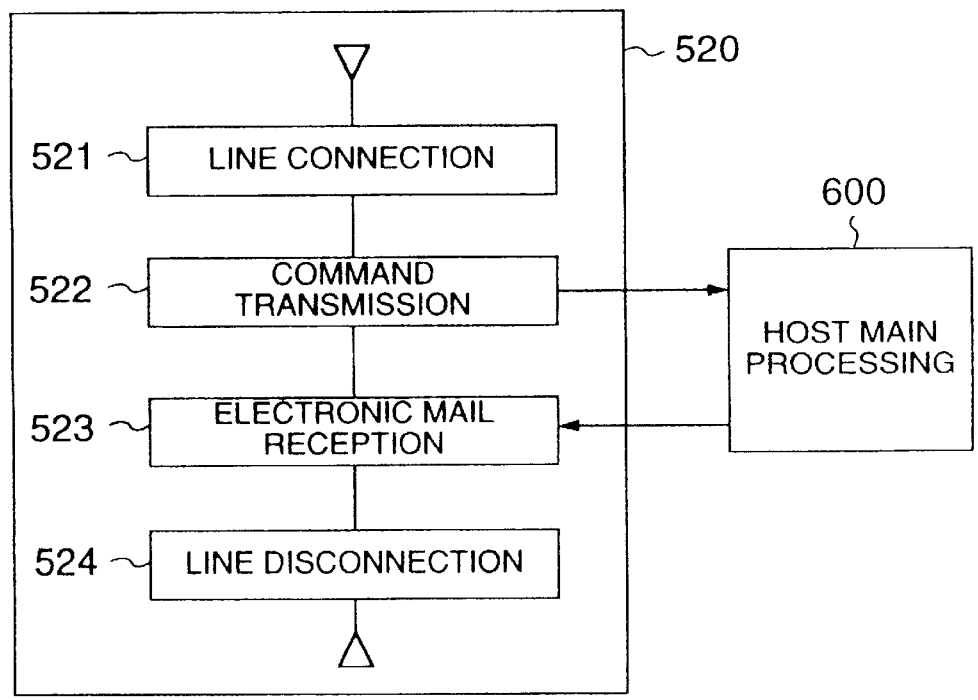
FIG. 14 is a flow chart illustrating an example of electronic mail fetch processing under the automatic electronic mail transfer control, to be executed by the handheld terminal device with the communication function shown in FIG. 2.

FIG. 14 is a flow chart illustrating an example of the electronic mail fetch processing to be executed by the handheld terminal device with the communication function shown in FIG. 2, under an electronic mail automatic transfer control. Referring to FIG. 14, the telephone number 212 contained in the new arrival message 200 is first read and the handheld phone transceiver unit 107 redials this number 212 to establish a line connection to the host computer 110 (Step 521). A transfer request message 250 is transmitted via the line connected at Step 521 to the host computer 110 (Step 522). The transfer request message 250 is formed by setting the "electronic mail fetch request" command to the command 251 and by setting an electronic ID 271 designated by the new arrival message 200 and identifying the new file to the command parameter 252. The electronic mail is then received from the host computer 110 by using the XMODEM protocol (Step 523). After the electronic mail is received, the telephone line connected at Step 521 is disconnected (Step 524). Similar to the file fetch processing 510, also in the electronic mail fetch processing 520, it may be arranged to automatically redial if the line connection cannot be established. Prior to the line connection Step 521, the same step as the user confirmation Step 515 may be set.

As described above, a user of the handheld terminal device 100 can automatically fetch a newly arrived file or electronic mail by using the contents of the newly arrived message transmitted from the host computer 110, even if the user does not know a telephone number for the access to the host computer.

In another embodiment, it may be arranged to check, prior to starting the processing of fetching a file (or electronic mail) designated by the new arrival message 200, whether the handheld terminal device 100 has sufficient storage area for storing the file (or electronic mail), and to suspend the file fetch if there is no sufficient storage area.

Figure 15:
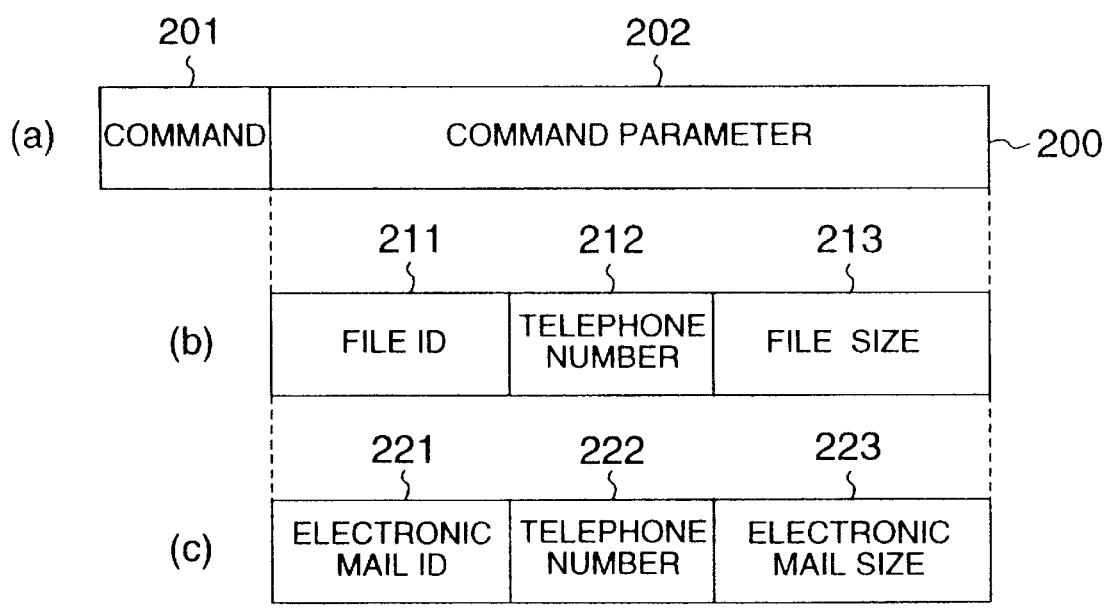
FIG. 15 shows examples of the formats of a new arrival message to be transferred in the automatic data transfer system of the invention.

FIG. 15 is a diagram showing other examples of the format of the new data file arrival message to be transferred in the automatic data transfer system according to another embodiment of this invention. In this embodiment, the formats of the command parameter 202 of the new arrival message 200 are changed. In FIG. 15(*b*), if the "new arrival file notice" command is set to the command 201, a file size 213 is set to the command parameter 202, in addition to the file ID 211 and telephone number 212 shown in FIG. 4(*b*). The file size 213 is a size of the file designated by the file ID 211. In FIG. 15(*c*), if the "new electronic mail arrival notice" command is set to the command 201, an electronic mail size 223 is set to the command parameter 202, in addition to the electronic mail ID 221 and telephone number 222 shown in FIG. 4(*c*). The electronic mail size 223 is a size of the electronic mail designated by the electronic mail ID 221.

Figure 16:
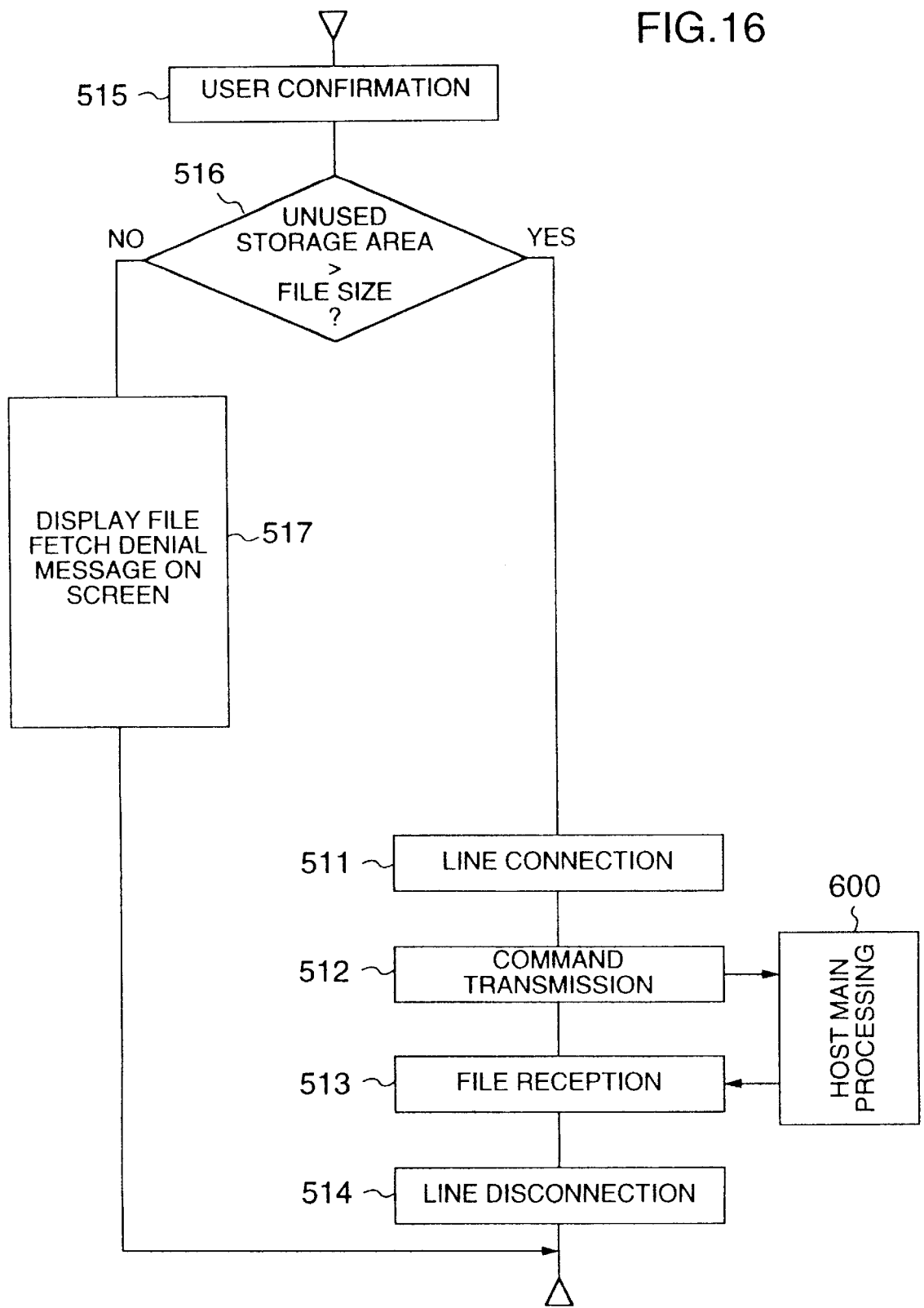
FIG. 16 is a flow chart illustrating another example of data file fetch processing under the automatic data file transfer control, to be executed by the handheld terminal device with the communication function shown in FIG. 2.
Figure 17A:
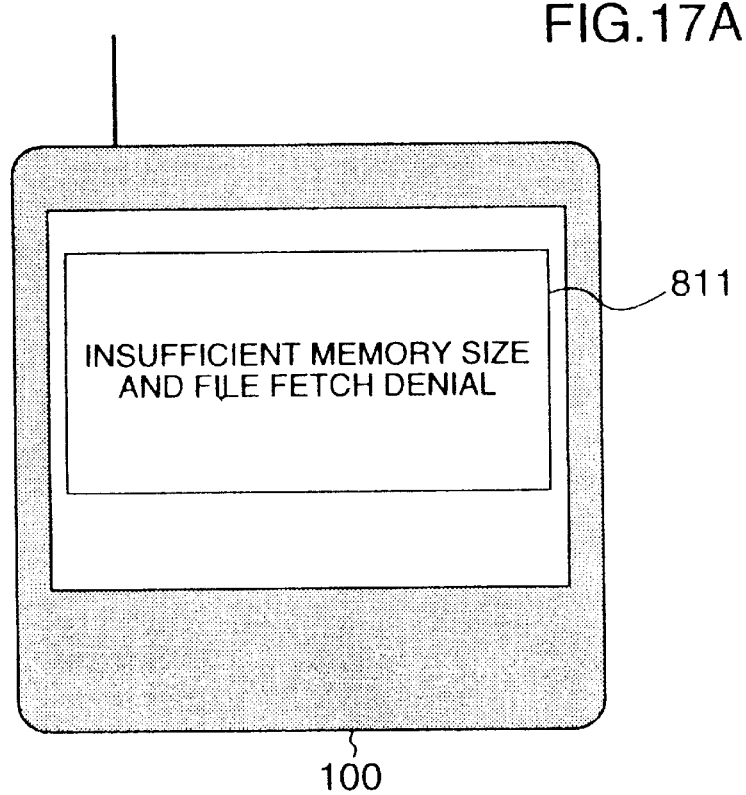
FIGS. 17A and 17B show display examples on the screen made by the processings illustrated in FIG. 16.

FIG. 16 is a flow chart illustrating another example of the file fetch processing to be executed by the handheld terminal device with the communication function shown in FIG. 2, under a data file automatic transfer control. The processings at Steps 511 to 515 are the same as FIG. 12, and so the description thereof is omitted. Referring to FIG. 16, a user is first instructed to confirm whether the file is fetched (Step 515). If the user suspends the fetch at Step 515, the processing is terminated. If the user instructs the fetch, then the capacity of an unused memory area in a reserved area for the file in the storage unit 104 shown in FIG. 2 is compared with the file size 213 contained in the new arrival message 200 (Step 515). If the capacity of the unused memory area is larger than the file size 213, the processings at Steps 511 to 514 are executed to complete the file fetch processing 510*a*. If the capacity of the unused memory area is smaller than the file size 213, a message 811 to the effect that the file fetch is suspended is displayed on the screen as shown in FIG. 17A to notify the user of it, and the file fetch processing 510*a* is suspended (Step 517).

Figure 17B:
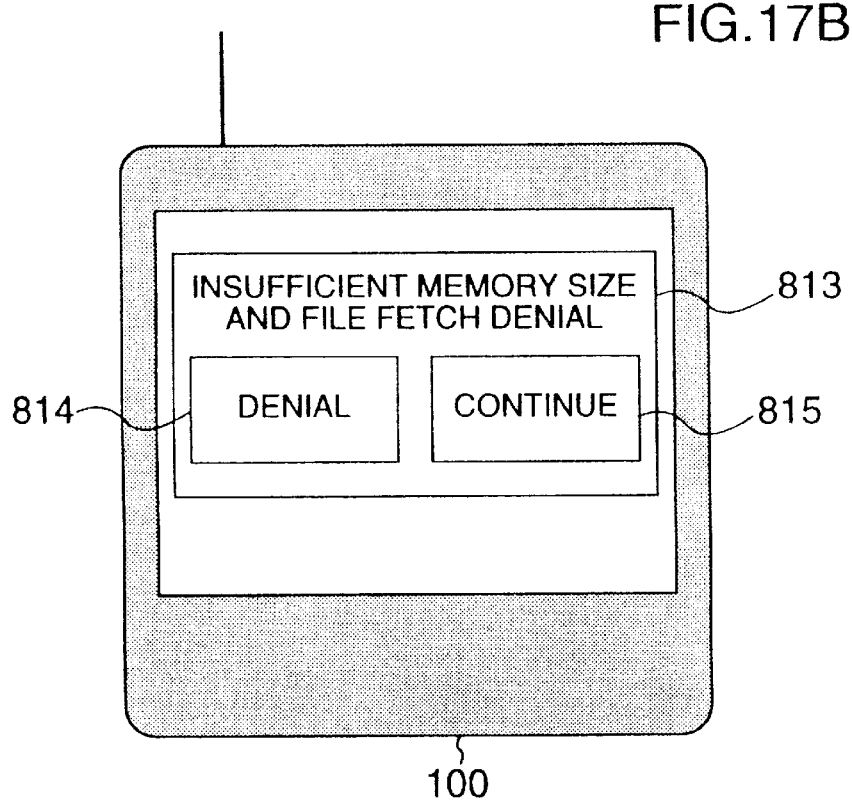

In this embodiment, although the file fetch processing is suspended, the file may be fetched to the extent within the capacity of the unused memory area, in accordance with a user choice. In this case, a message 813 such as shown in FIG. 17B is displayed on the screen to notify the user of it at Step 517 shown in FIG. 16. If the user depresses a denial button 814, the file fetch processing 510*a* is unconditionally suspended, whereas if the user depresses a continue button 815, the file reception at Step 513 is performed until the unused memory area is fully consumed, and thereafter the file fetch processing 510*a* is terminated. Part of the received file, which was not stored in the storage area because of an excess of the unused memory area, is discarded.

Figure 18:
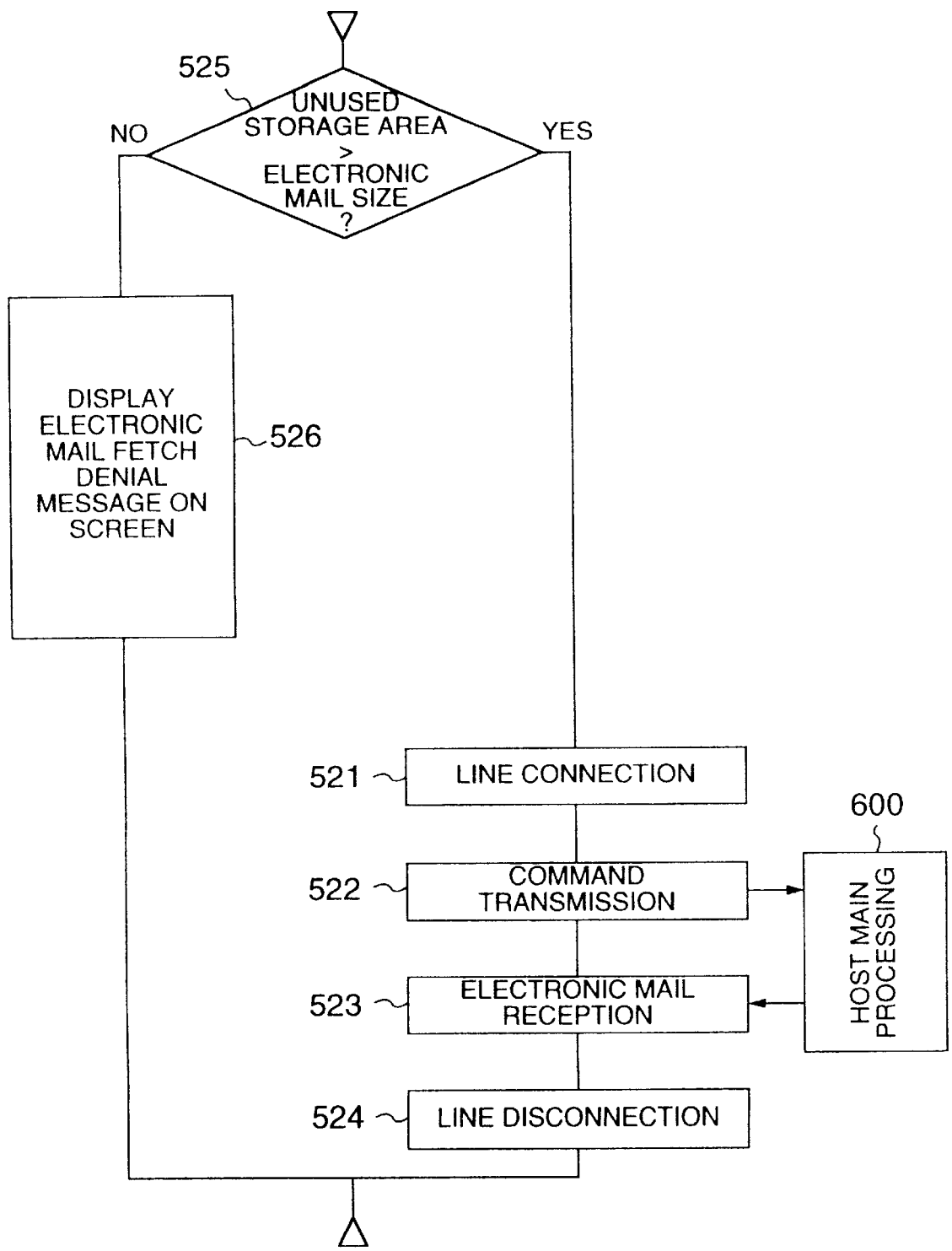
FIG. 18 is a flow chart illustrating another example of the electronic mail fetch processing under he automatic electronic transfer control, to be executed by the handheld terminal device with the communication function shown in FIG. 2.
Figure 19:
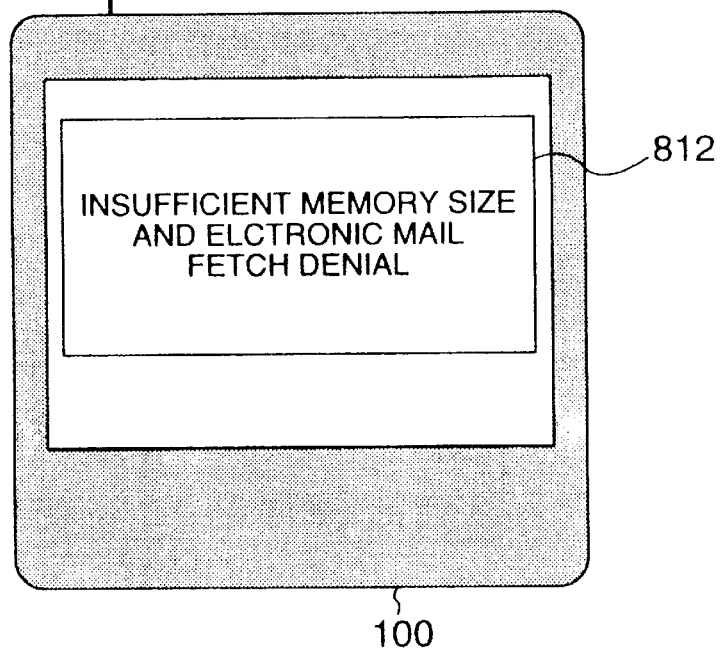
FIG. 19 shows a display example on the screen made by the processings illustrated in FIG. 18.

FIG. 18 is a flow chart illustrating another example of the electronic mail fetch processing to be executed by the handheld terminal device with the communication function shown in FIG. 2, under an electronic mail automatic transfer control. The processings at Steps 521 to 524 are the same as FIG. 12, and so the description thereof is omitted. Referring to FIG. 18, the capacity of an unused memory area in a reserved area for the electronic mail in the storage unit 104 shown in FIG. 2 is compared with the electronic mail size 223 contained in the new arrival message 200 (Step 525). If the capacity of the unused memory area is larger than the electronic mail size 213, the processings at Steps 521 to 524 are executed to complete the electronic mail fetch processing 520*a*. If the capacity of the unused memory area is smaller than the electronic mail size 223, a message 812 to the effect that the electronic mail fetch is suspended is displayed on the screen as shown in FIG. 19 to notify the user of it, and the electronic mail fetch processing 520*a* is suspended (Step 526). Similar to the file fetch processing, also in the electronic mail fetch processing, the electronic mail may be fetched until the unused memory area is fully consumed, and part of the received electronic mail, which was not stored in the storage area because of an excess of the unused memory area, is discarded.

In the above embodiments, electronic mail is fetched by transmitting the electronic mail fetch request" command to the host computer 110. Instead, the electric mail may be read by using the handheld terminal device as a communications network terminal.

Figure 20:
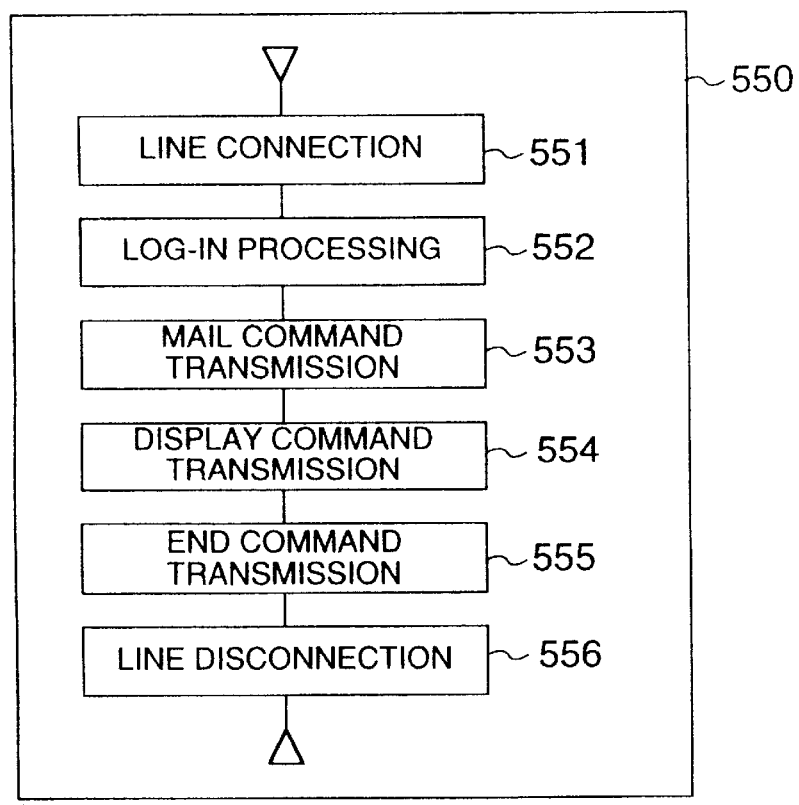
FIG. 20 is a flow chart illustrating an example of the electronic mail read procedure using a log-in processing to be performed by the handheld terminal device with the communication function shown in FIG. 2.

FIG. 20 is a flow chart illustrating an example of an electronic mail read processing to be executed by the handheld terminal device shown in FIG. 2, under a log-in control. This processing is an electronic mail read processing 550 which is the same as the processing of reading an electronic mail from Internet. Data transfer to and from the host computer 110 is performed one character after another via the handheld phone transceiver unit 107 shown in FIG. 2.

Referring to FIG. 20, first the telephone number 212 contained in the new data file arrival message 200 received from the host computer 110 is read, and this number 212 is dialed via the handheld phone transceiver unit 107 to establish a line connection to the host computer 110 (Step 551). Next, a user ID and a password are transmitted to the host computer 110 to perform a log-in processing for the host computer 110 (Step 552). A mail command (e.g., a character string "mail") is then transmitted to make the host computer 110 enter the mail mode (Step 535), and then a mail display command (e.g., a character "p") is transmitted to read newly arrived electronic mail (Step 554). In this case, the contents of the mail are received from the host computer 110 one character after another. After the mail is read, a quit command (eg. a character string "q") is transmitted to terminate the mail mode (Step 555). Lastly, the line connected at Step 551 is disconnected (Step 556). In this embodiment, the host computer 110 runs not on the host main processing 600 but on an electronic mail program for Internet which is commercially available.

If the handheld terminal device 100 is used as a communications network terminal as described above, whether the contents of electronic mail received from the host computer 110 and displayed on the display unit 102 are stored in the storage unit 104 of the handheld terminal device 100, can be set arbitrarily. An electronic mail service provided by an individual personal computer, instead of Internet, may be used for the electronic mail reading procedure. In this case, a character string is transmitted in accordance with the procedure independently defined by each personal computer communications network.

In the embodiments described above, a wired telephone may be used instead of the handheld phone. In this case, the handheld phone transceiver unit 107 of the handheld terminal device 100 is replaced by a wired telephone transceiver unit. A particular example of the wired telephone transceiver unit is a DATA/FAX modem. If the handheld terminal device is operated with a lower power supply until any message is received at the message reception unit 105 shown in FIG. 2 and thereafter it is fully operated, then the power consumption thereof can be reduced. This is because the pager operating with a small power is used for calling the handheld terminal device and it is not necessary for the handheld phone to be always "on".

Next, another embodiment of the data transfer system of this invention will be described. In the following description, data transfer is directed only to image data sent from FAX to a handheld terminal device. However, the invention is not limited to FAX image data but other data such as graphics data and voice data may be used.

Figure 21:
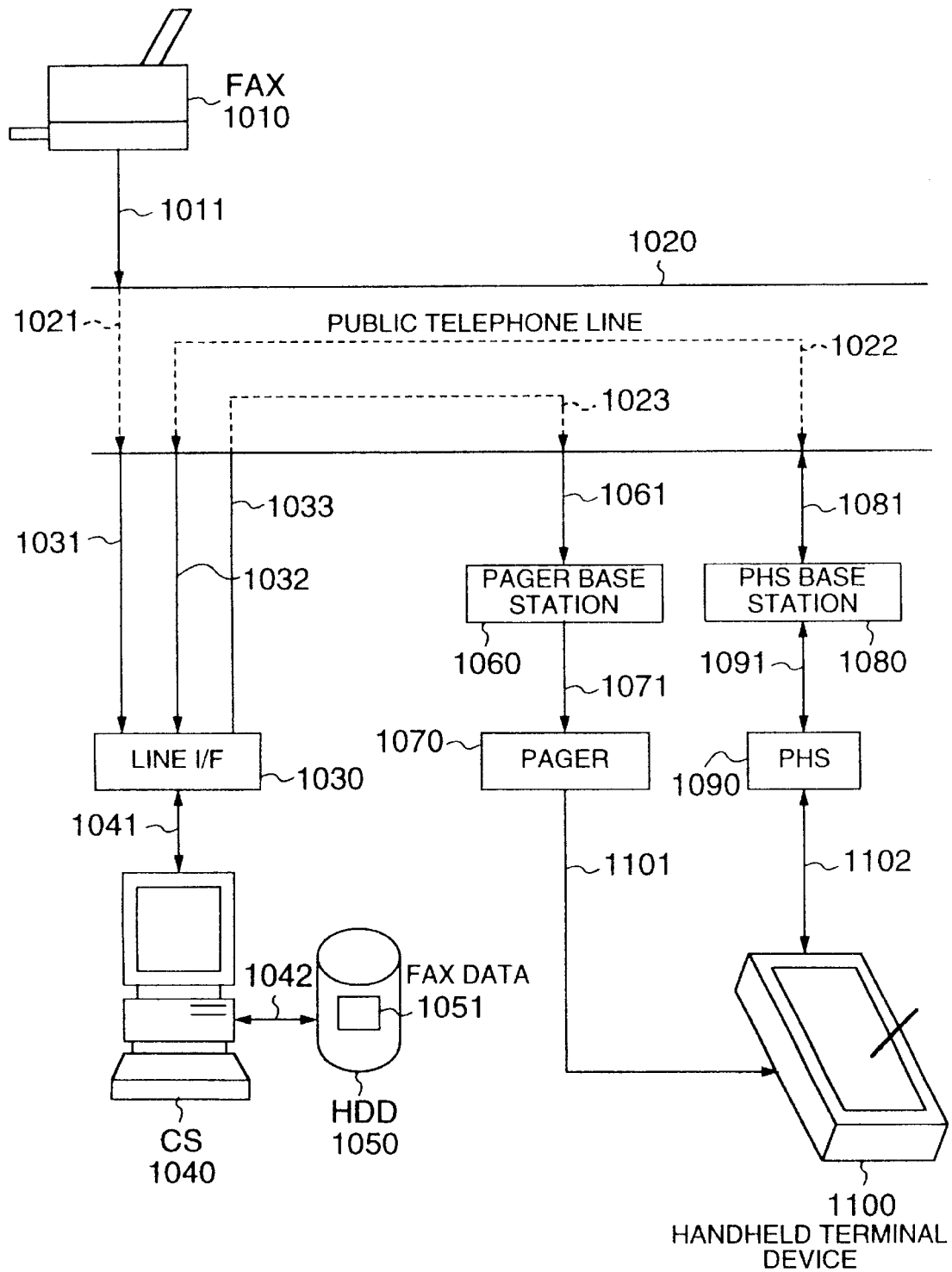
FIG. 21 is a block diagram showing the overall structure of the data transfer system according to another embodiment of the invention.

FIG. 21 is a block diagram showing the whole structure of a data transfer system according to an embodiment of the invention. In FIG. 21, a FAX signal 1011 transmitted from a FAX 1010 passes through a public telephone line 1020 and thereafter is input via a line I/F 1030 to a communication server (hereinafter abbreviated to "CS") 1040. CS 1040 stores the FAX signal in its hard disk drive (hereinafter abbreviated to "HDD") 1050 as FAX data 1051.

Next, CS 1040 sends a message indicating a new FAX arrival to a pager 1070 via the line I/F 1030 and public telephone line, the pager 1070 being connected to a handheld terminal device 1100 designated as a transmission destination. Upon reception of this message in the form of digital signal from the pager 1070, the handheld terminal device 1100 notifies the user of a FAX arrival. Lastly, the handheld terminal device 1100 automatically or upon request from the user dials CS 1040 by using a personal handyphone system 1090 (hereinafter abbreviated to "PHS") connected to the handheld terminal device 1100, PHS being one kind of handheld phones, and establishes communication lines (1091–1081–1022–1032). Via these lines the FAX data 1051 transferred from CS 1040 is received.

Figure 22A:
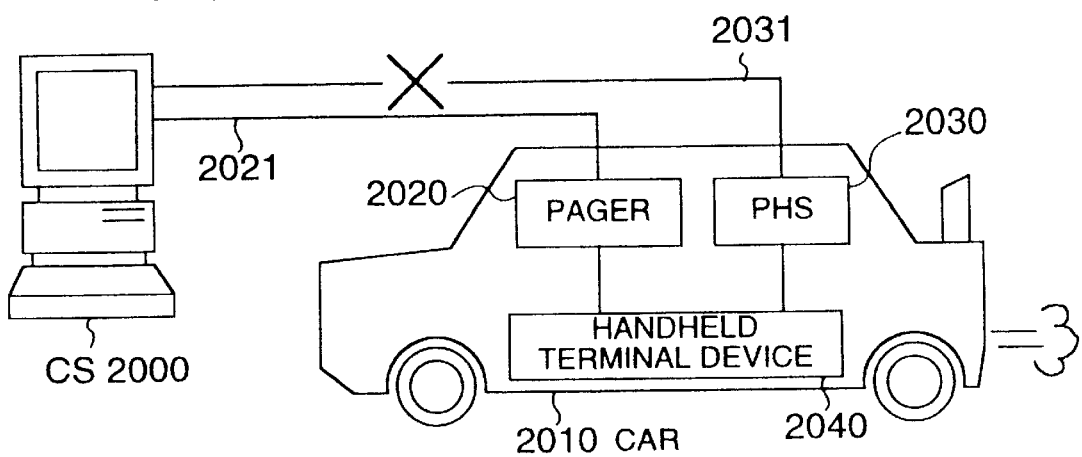
FIGS. 22A to 22C are schematic diagrams illustrating the procedure of fetching FAX image data by a user having the handheld terminal device shown in FIG. 21 during the movement.
Figure 22B:
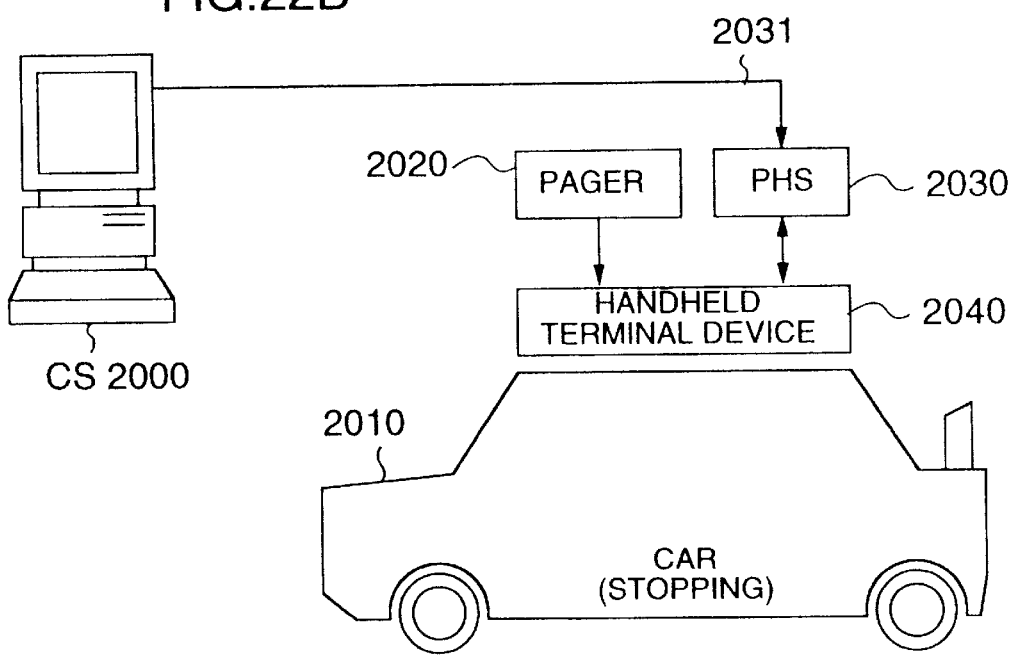
Figure 22C:
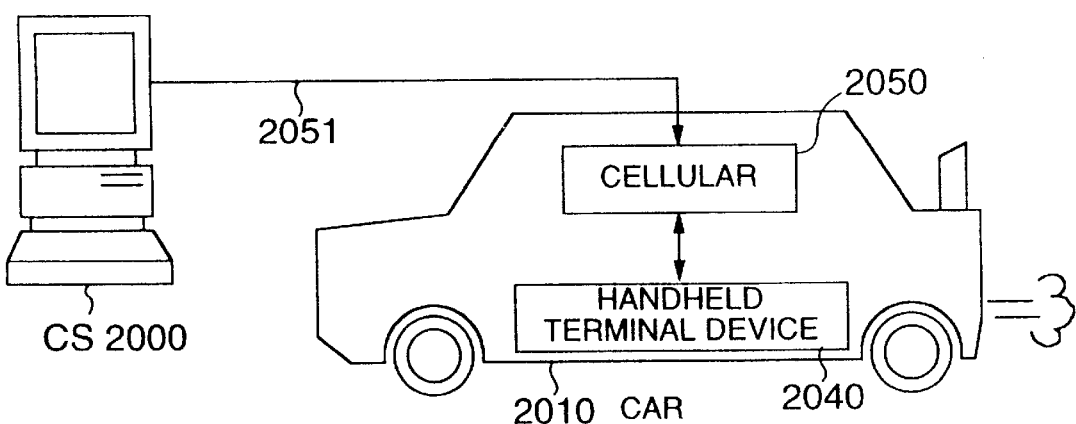

FIGS. 22A to 22C are schematic diagrams illustrating a brief procedure to be performed by a moving user with the handheld terminal device shown in FIG. 21 at hand, for the acquisition of FAX image data. FIG. 22A illustrates that a user of a handheld terminal device 2040 is moving in a car 2010. When CS 2000 receives a FAX signal, CS 2000 sends a message indicating a new FAX arrival to a pager 2020 connected to the handheld terminal device 2040. Although the handheld terminal device 2040 can be informed of a FAX arrival upon reception of the message, PHS 2030 has a disadvantage in that it cannot communicate during the movement. Therefore, although the handheld terminal device 2040 can be notified of the FAX arrival from the pager 2020, the FAX data cannot be immediately received by PHS 2030.

FIG. 22B illustrates that the car 2010 is stopped, therefore, the handheld terminal device 2040 is also at a standstill. It is therefore possible for PHS 2030 connected to the handheld terminal device 2040 to dial CS 2000 and connect CS 2000 to a line 2031 for the reception of the FAX data.

FIG. 22C illustrates that the radio communication apparatus connected to the handheld terminal device 2040 is not a pager nor a PHS but a cellular radio 2050 capable of performing radio communications even during the movement in the car 2010. In this case, even if the car 2010 is moving, a FAX arrival can be notified from CS 2000 to the handheld terminal device 2040 by using the cellular radio 2050, and the FAX data can be transmitted via the same channel.

The difference of FIGS. 22A and 22B from FIG. 22C is that the radio communication apparatus in FIGS. 22A and 22B is not cellular radio, but a pager and PHS. PHS has on one hand a disadvantage that FAX data cannot be received during the movement, and has on the other hand an advantage of a very low radio communication line use fee and a long battery life. However, no communication is possible during the movement of the PHS. Therefore, a FAX arrival message is received at the handheld terminal device by a pager of a low running cost, and when it becomes possible to use PHS, a telephone call is performed to receive the FAX data.

Figure 23:
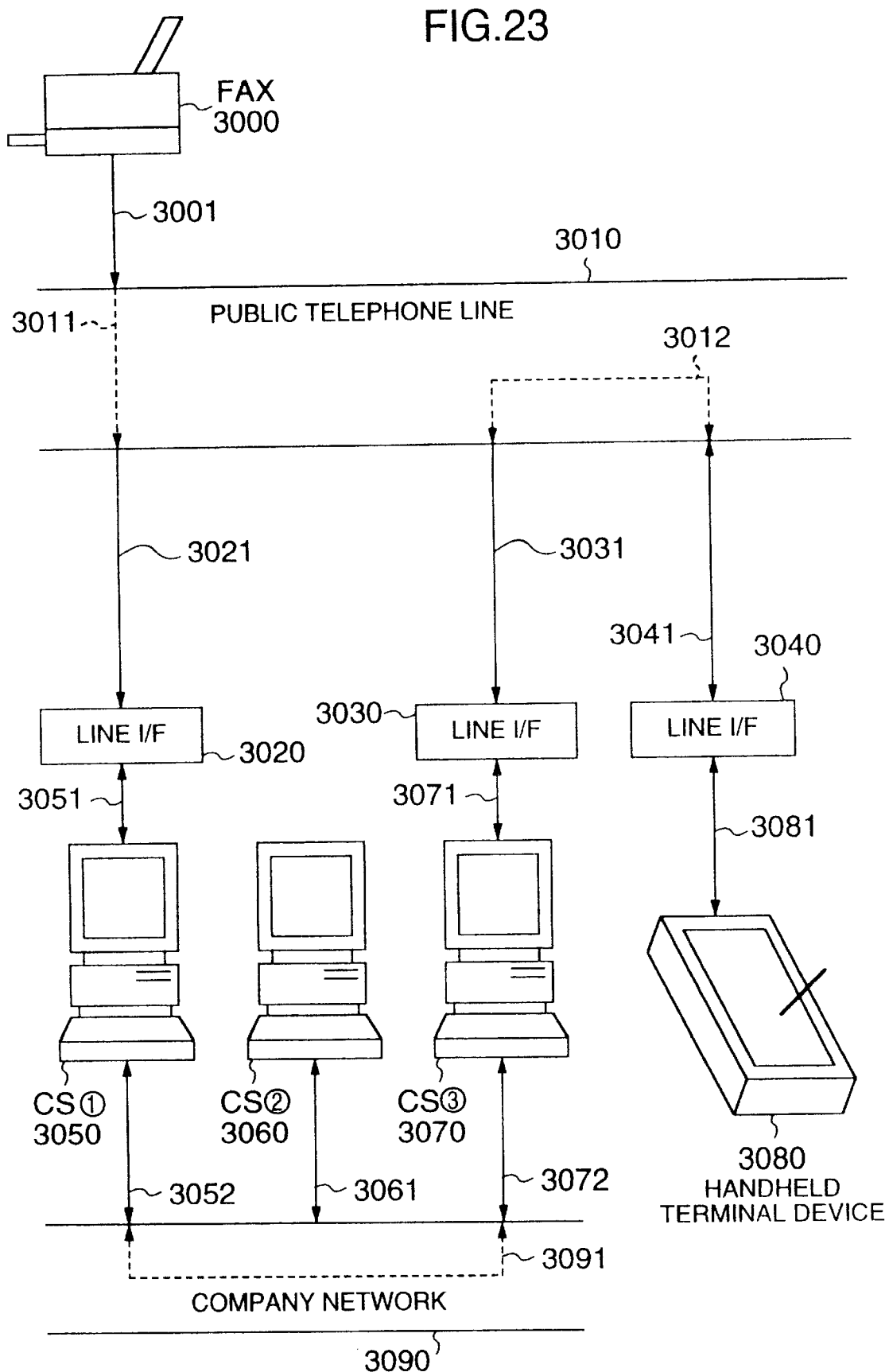
FIG. 23 is a block diagram showing the overall structure of the data transfer system with a plurality of communication servers according to a further embodiment of the invention.

FIG. 23 is a block diagram showing the overall structure of a data transfer system with a plurality of communication servers CS according to another embodiment of the invention. This block diagram illustrates the operation to be performed when a service area of a handheld terminal device is broad and a plurality of CSs are distributed in this broad service area. The portion of the system in which a FAX 3000 transmits FAX data to CS (1) 3050 via a public telephone line 3010, is the same as FIG. 21 and so the description thereof is omitted. In this embodiment, a plurality of CSs are used. Consider for example the case wherein FAX 3000 transmits FAX data to CS (1) 3050 installed at the Tokyo district, and CS (1) knows that the user of the handheld terminal device 3080 designated as the destination is in the Ibaraki district. In the embodiment shown in FIG. 21, it is required that CS (1) at the Tokyo district directly connect to the handheld terminal device at the Ibaraki district by using the public telephone line. However, in this embodiment, a certain company configures the system with a plurality of CSs distributed throughout the country each being interconnected by proprietary lines of a company network 3090. This LAN 3090 is the company's property so that the line use fee is not proportional to the use time and it may be considered that the line use fee is free.

By using this company network 3090, CS (1) 3050 at the Tokyo district transmits a FAX arrival message as well as FAX data to CS (3) 3070 at the Ibaraki district. CS (3) 3070 sends a FAX arrival message to the handheld terminal device 3080 in the Ibaraki district by accessing the public telephone line 3010. The FAX data is also transmitted. In this manner, in transferring FAX data to a handheld terminal device at a remote site, the proprietary company network is effectively used without using the public telephone network of high cost as much as possible. Therefore, FAX data having a large data amount can be transferred with low cost.

Figure 24:
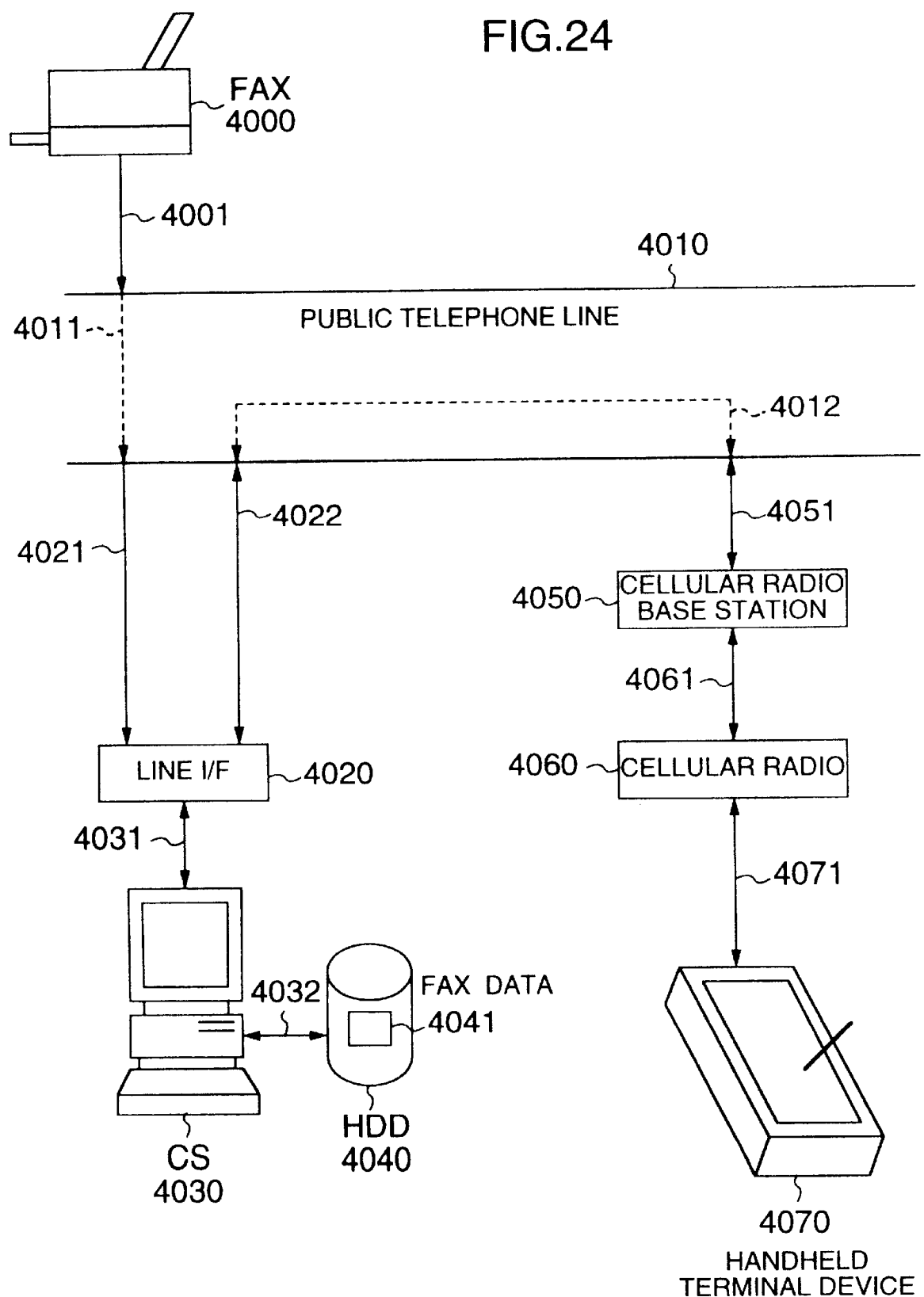
FIG. 24 is a block diagram showing the overall structure of the data transfer system wherein a handheld terminal device has a cellular radio, according to still another embodiment of the invention.

FIG. 24 is a block diagram showing the overall structure of a data transfer system in which a handheld terminal device has a cellular radio. The portion of the system in which a FAX 4000 transmits FAX data to CS via a public telephone line 4010, is the same as FIG. 21 and so the description thereof is omitted. In this embodiment, a handheld terminal device 4070 is connected to a cellular radio 4060 which is a mobile communication apparatus. As described with FIG. 22C, the cellular radio 4060 can communicate even during the movement, and can perform both the transmission and reception during the movement. When CS 4030 receives a FAX signal, it accesses a public telephone line 4010 via a line I/F 4020. Via a cellular radio base station 4050, the cellular radio 4060 connected to the handheld terminal device 4070 is called to send a FAX arrival message. At this time, a bidirectional line is established between CS 4030 and the handheld terminal device 4070. Therefore, the user of the handheld terminal device can confirm the FAX arrival message and request CS 4030 to transmit FAX data 4041 stored in HDD 4040 of CS 4030 to the handheld terminal device 4070. In this manner, the handheld terminal device 4070 can obtain the FAX data received at CS 4030 immediately on site.

Interposition of CS between FAX and the handheld terminal device without a direct communication therebetween similar to FIG. 21 allows FAX to transmit data with a designated destination of the handheld terminal at any time even under the communication inability state such as a busy state of the phone of the handheld terminal device, a movement state of PHS, and a battery-down state. After the radio communication apparatus installed at the handheld terminal device becomes operable, the FAX data can be fetched from CS at any time.

FIG. 25 shows an example of the contents of transmission data to be transmitted from FAX to a handheld terminal device via a communication server. Message data is transmitted from FAX, to CS, and to a handheld terminal device in the following order of (1) to (8).

(1) An originating FAX calls an exchange of a public telephone line to transmit a FAX signal. Specifically, the telephone number of a receiving CS is sent to the exchange to establish a telephone line to CS. This signal format is either a tone signal or a dial pulse signal.

(2) FAX supplies CS with an ID number of the handheld terminal device to which FAX image data is to be transmitted. This signal format is a tone signal in this case. The transmission condition is an issue of a carrier signal by CS, the carrier signal indicating that CS can receive the ID number of the handheld terminal device.

(3) FAX transmits a digital FAX image data signal to CS. This signal is a normally used FAX signal itself. Upon reception of the digital signal constituting the FAX image data, CS stores it in HDD.

(4) CS transmits a call telephone number of a pager connected to a destination handheld terminal device, to an exchange.

(5) CS transmits a FAX arrival message to the destination handheld terminal device via the pager. This signal format is a digital signal representing a character string usually recognized by the pager.

(6) The destination handheld terminal device sends the call telephone number of CS to the exchange to establish a telephone line connection to CS.

(7) The destination handheld terminal device sends a FAX image transmission request to CS.

(8) Upon reception of this request, CS transmits the FAX image data stored in its HDD to the destination handheld terminal device.

FIG. 26 shows another example of the contents of transmission data to be transmitted from FAX to a handheld terminal device via a communication server. Message data is transmitted from FAX, to CS, and to a handheld terminal device in the following order of (1) to (8). In FIG. 26, the transmission station, destination station, and message contents of (1) to (8) are the same as FIG. 25. In this example, the signal format used at (2) when FAX sends the ID number of a destination handheld terminal device, is a digital signal instead of the tone signal used at (2) of FIG. 25. In order for FAX to transmit a message other than the FAX image signal, there is no other method than to use the tone signal of a telephone. However, in the case of the data transfer system of this invention using FAX satisfying the system conditions, or in the case of the system wherein a personal computer and modem generate a FAX image data signal, the digital signal can be transferred between FAX and CS. In this case, not only the ID number of the destination handheld terminal device, but also a message indicating the brief contents of the FAX image as will be later described with FIG. 30, a password necessary for security, and other data can also be transmitted.

FIG. 27 shows the detailed contents of the transmission data shown in FIG. 26. The fundamental transmission station and destination station are the same as those shown in FIGS. 25 and 26. The additional processings include the processing (3) wherein FAX transmits a FAX header in the form of digital signal to CS, the FAX header containing the brief contents of the FAX image data, the originating station ID, and other information, and the processing (9) wherein CS transmits the received FAX header to the handheld terminal device. Therefore, it is possible to know the brief contents of the FAX image data from the received FAX header prior to requesting the image data transfer from the destination handheld terminal device, and to allow the user beforehand to judge whether the FAX image data is to be transmitted at once.

FIGS. 28A to 28C show examples of the format of a message to be transferred from a communication server to a handheld terminal device when CS at (5) in FIG. 25 transmits a FAX arrival message to the handheld terminal device. FIG. 28A illustrates image data transmitted from FAX to CS. Generally, FAX transmits a header image prior to transmitting the FAX image read by its scanner. The header image includes the originating station name, telephone number, date, time, and other data. FIG. 28B illustrates the contents of the FAX header which CS transmits to the handheld terminal device via the pager connected thereto. In this case, the image pattern of the FAX header received by CS is converted into character codes through character recognition, and the character codes are transmitted. FIG. 28C illustrates FAX image data which CS transmits to the handheld terminal device after the handheld terminal device requests the FAX image data transmission to CS.

The character codes of the FAX header illustrated in FIG. 28B are transmitted to the handheld terminal device prior to transmitting the FAX image data. The character recognition is performed erroneously in some cases. Therefore, when CS transmits the FAX image data to the handheld terminal device, it is preferable to transmit both the FAX header image data received from FAX and the FAX image data. A character recognition circuit for the FAX header will be described later with reference to FIG. 36. If the character recognition is precisely performed, it is not necessary to transmit the FAX header image data. As to a scheme of character recognition, the character recognition circuit of CS may calculate a recognition precision, and if the precision is lower than a predetermined value, the FAX header image data is transmitted. The handheld terminal device always receives only image data when the FAX header is transmitted or not transmitted. Therefore, it is not necessary for CS to inform in advance the handheld terminal device of a message in effect that the FAX image is transmitted.

FIG. 29 shows examples of the contents of a message to be transmitted from a communication server to a handheld terminal device. In FIG. 29, (1) indicates a FAX arrival message transmitted from CS to a handheld terminal device. (2) indicates ID information transmitted from an originating FAX to a destination FAX, the ID information including the name of the originating FAX, telephone number, and other data. The ID information is one means of supplying the destination FAX with as much of the FAX information possible. (3) indicates a received date and time, (4) indicates a telephone number for calling the associated CS, and (5) indicates an ID of the associated CS, whereby the ID information becomes necessary if a plurality of CSs are installed as shown in FIG. 23. (6) indicates a management number for received FAX image data at CS. This number is used for the discrimination between FAX images when the destination handheld terminal device requests the FAX image transmission to CS. (7) indicates the data length of the received FAX image data which is used to judge whether the handheld terminal device can fetch all of the received FAX image data. If all of the received FAX image data cannot be fetched, the handheld terminal device judges not to send a FAX image data transmission request, or alternatively the handheld terminal device requests CS to transmit it to a nearby FAX as will be later described with FIG. 40. (8) indicates header characters of the received FAX image corresponding to FIG. 28B.

Figure 30:
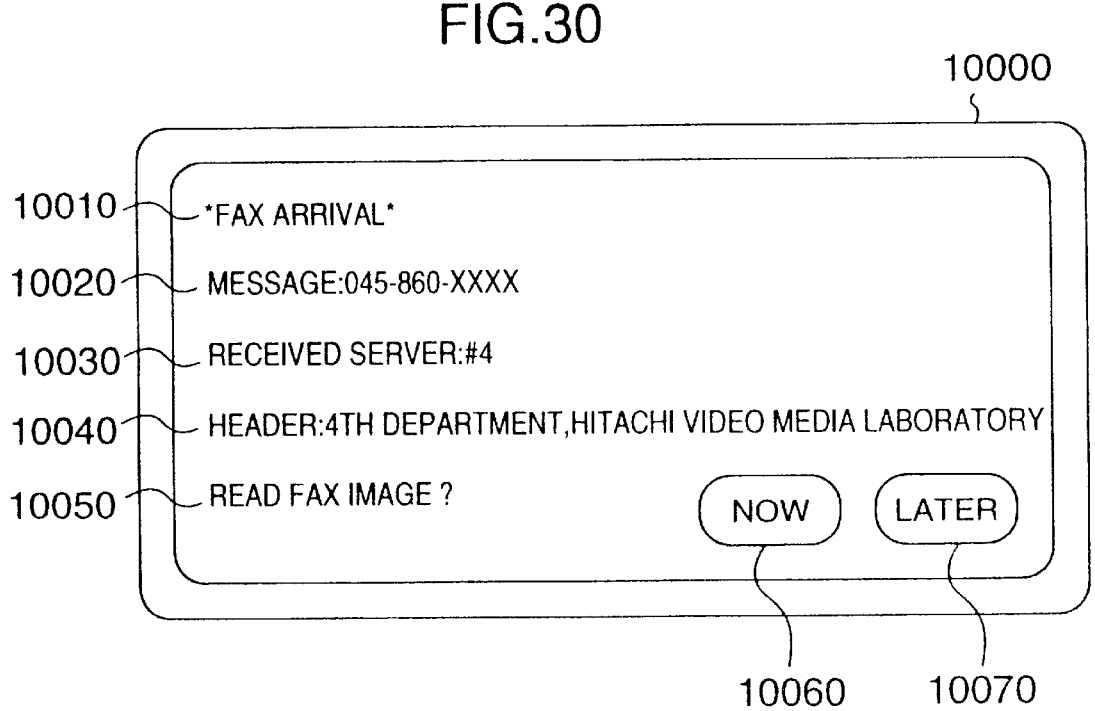
FIG. 30 shows a display example of messages on a handheld terminal device, the messages being shown in FIG. 29.

FIG. 30 shows a display example of messages shown in FIG. 29, the message representative of a FAX arrival received by the pager being displayed on the handheld terminal device. In FIG. 30, numeral 10000 represents a display device of the handheld terminal device. In this embodiment, the display device has a display unit such as a liquid crystal panel and a touch panel for coordinate detection of a contact of a pen or a finger, the display unit and touch panel being superposed one upon the other. Numeral 10010 represents a message of a FAX arrival, and numeral 10020 represents a message transmitted from FAX indicated at (2) of FIG. 29. Numeral 10030 represents a serial number of CS which is used for searching a database in the handheld terminal device in association with the telephone number of CS. Specifically, the database in the handheld terminal device is checked whether there is the telephone number indicated at (4) of FIG. 29. If not, this telephone number is newly registered, or if the telephone number is different from that stored in the handheld terminal device, it is basically judged as a transmission error or in some case the received data is set with an alarm flag because of a possible forged FAX. Numeral 10040 indicates header characters for the FAX image data indicated at (8) of FIG. 29. Numeral 10050 represents a message urging the user to make decision as to whether the FAX image data is to be received. If the image data is to be received immediately on site, an icon 10060 is touched with a pen or finger, or if the image data may be read later, an icon 10070 is used.

Figure 31:
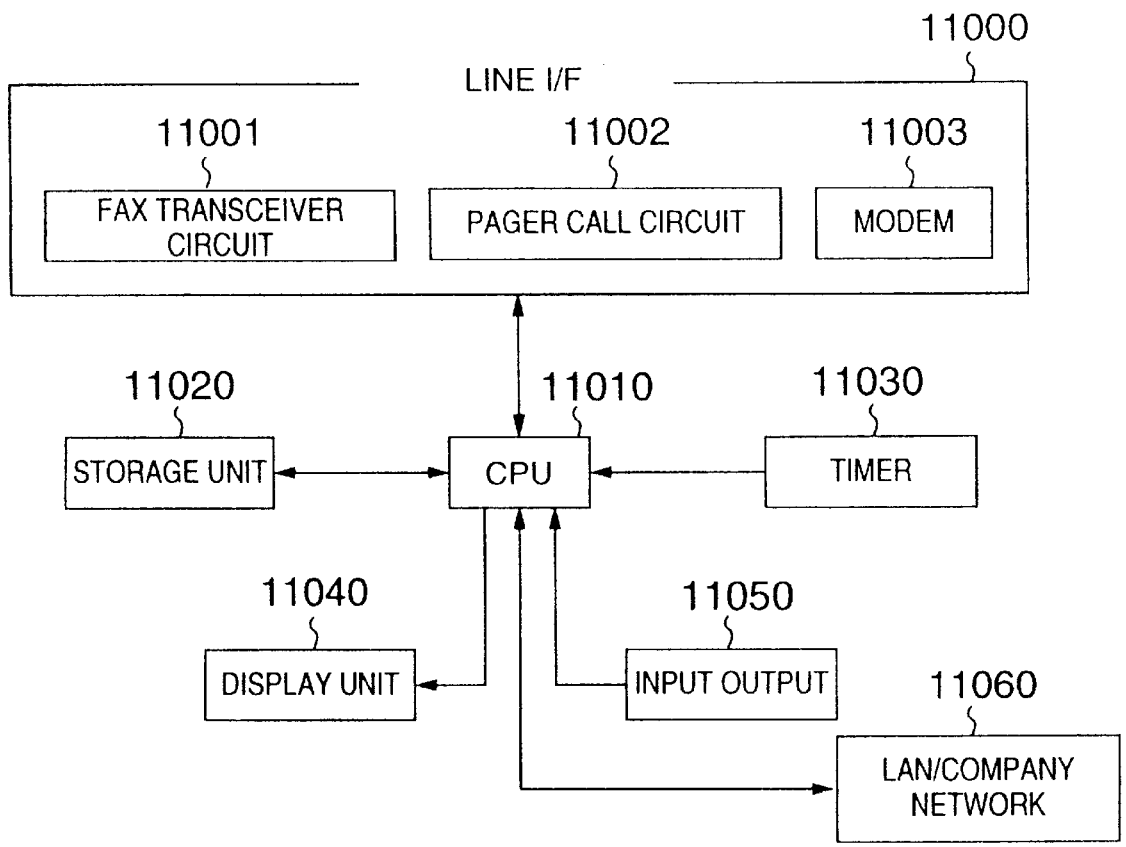
FIG. 31 is a block diagram showing an example of the functional structure of a communication server of the data transfer system of this invention.

FIG. 31 is a block diagram showing an example of the functional structure of a communication server of the data transfer system of this invention. In FIG. 31, numeral 11010 represents a CPU for controlling the communication server. Connected to CPU 11010 are a storage unit 11020 such as a memory, a timer 11030 such as a system clock or other clocks, a display unit 11040 such as a CRT display, an input unit 11050 such as a keyboard, as well as a LAN/company network like the company network shown in FIG. 23 via an IF (not shown). This communication server is configured similar for a general personal computer. A line I/F 11000 is connected to CPU 11010 of CS of this embodiment. The line I/F 11000 has a FAX transceiver circuit 11001, a pager call circuit 11002, and a modem 11003. The FAX transceiver circuit 11001 performs a reception process of receiving image data sent from FAX and a transmission process of transmitting image data to a handheld terminal device. The pager call circuit 11002 calls the pager connected to the handheld terminal device for the transmission of a message. The modem 11003 transmits and receives a command such as a FAX transmission command to and from the handheld terminal device, or transmits FAX image data in some cases not in ordinary FAX format but in the form of digital data.

Figure 32:
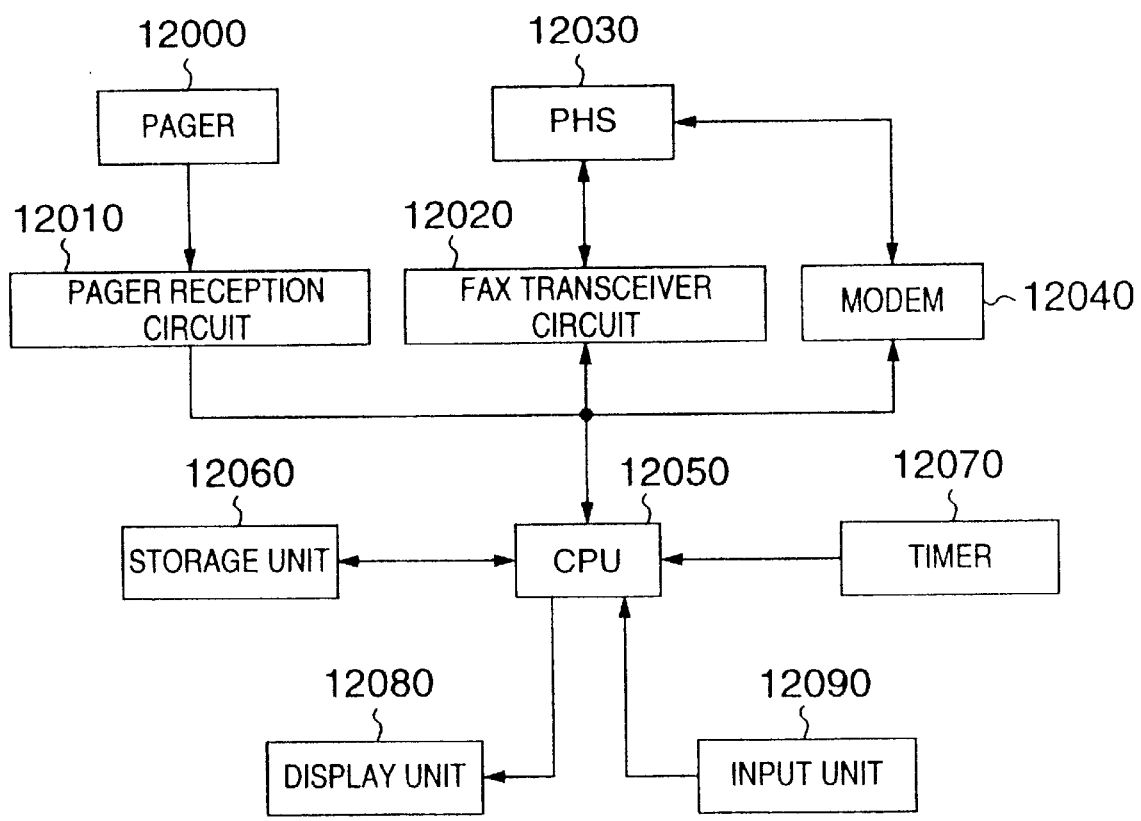
FIG. 32 is a block diagram showing an example of the functional structure of a handheld terminal device of the data transfer system of this invention.

FIG. 32 is a block diagram showing an example of the functional structure of a handheld terminal device of the data transfer system of this invention. In the structure of the handheld terminal device shown in FIG. 32, numeral 12050 represents a CPU to which are connected a storage unit 12060 such as a memory, a timer 12070 such as a system clock and other clocks, a display unit 12080 such as a liquid crystal panel, and an input unit such as a touch panel. In this embodiment, additionally connected to CPU 12050 are a pager 12000 via a pager reception circuit 12010, a FAX transceiver circuit 12020, and a modem 12040. The FAX transceiver circuit 12020 and the modem 12040 are connected to a PHS 12030. Each function is the same as the line I/F of CS shown in FIG. 31.

Figure 33:
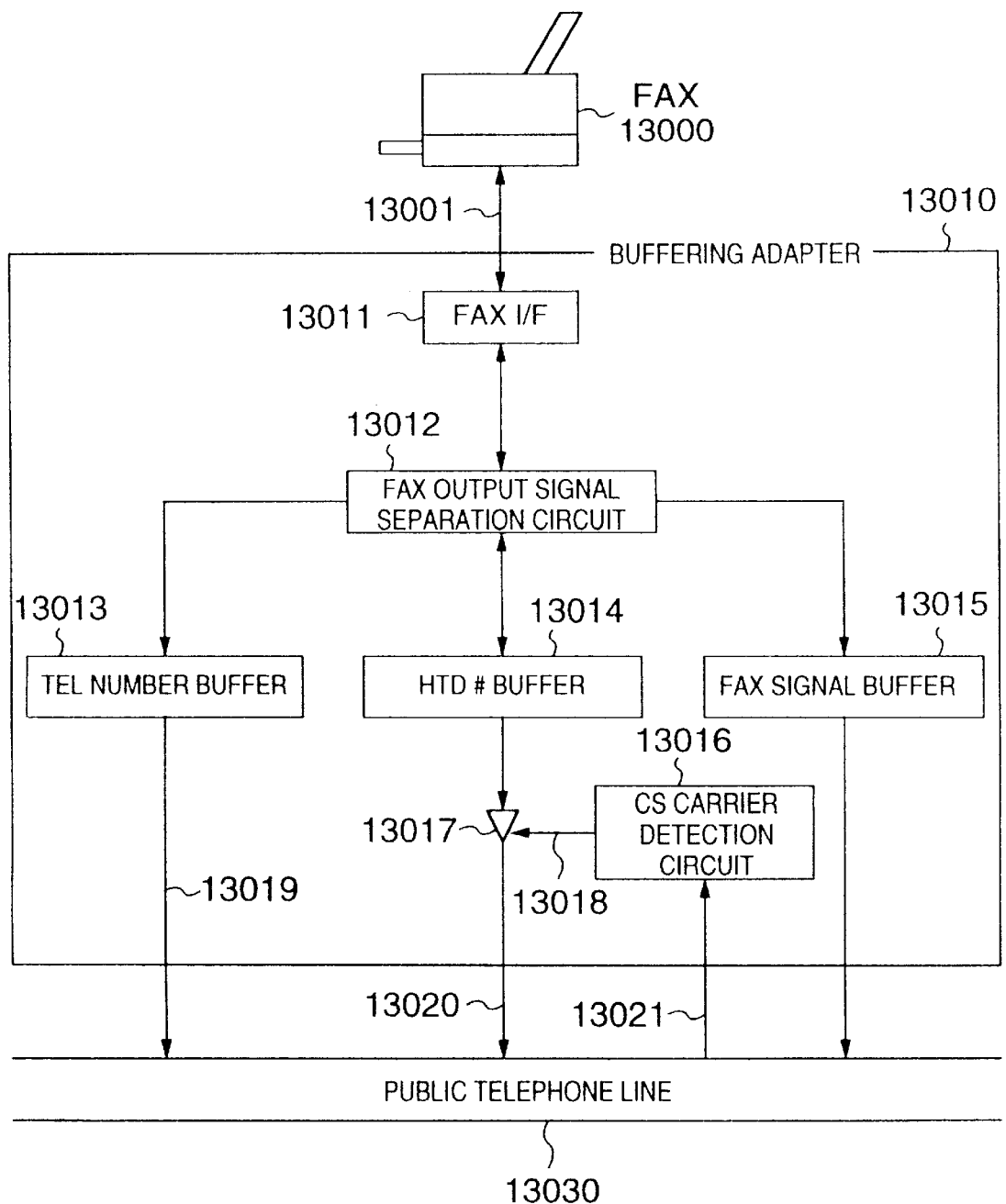
FIG. 33 is a block diagram showing an example of the functional structure of a buffering adapter of the data transfer system of this invention.

FIG. 33 is a block diagram showing an example of the functional structure of a buffering adapter of the data transfer system of this invention. With this buffering adapter, a user of FAX does not manually input, after the reception of a carrier from CS, the ID number of a destination handheld terminal device in the form of tone signal as illustrated at (2) of FIG. 25, but the carrier of CS is automatically detected and the ID number of the destination handheld terminal device is transmitted. As indicated at (1) to (3) of FIG. 25, a signal 13001 transmitted from an originating FAX 13000 includes first a tone signal (at (1) of FIG. 25) representative of the telephone number of CS, then a tone signal (at (2) of FIG. 25) representative of the number of a destination handheld terminal device, and lastly a digital signal (at (3) of FIG. 25) representative of the FAX image data.

The buffering adapter 13010 receives the signal 13001 via a FAX interface 13011, and the FAX signal separation circuit 1301 separates the signal 13001 into a CS telephone number signal, a handheld terminal device number signal, and a FAX image signal. The telephone number is stored in a TEL number buffer 13013, and thereafter output to a public telephone line 13030 to call CS. If CS is busy and the line cannot be established, the telephone number is again output from the TEL number buffer 13013 to the public telephone line 13030. The handheld terminal device number is stored in a HTD # buffer 13014, and stands by until a CS carrier detection circuit 13016 detects a reception carrier transmitted from CS. When CS transmits the reception carrier, the CS carrier detection circuit 13016 turns on a switch 13017 so that the handheld terminal device number stored in the HTD # buffer 13014 is output to CS via the public telephone line 13030. Thereafter, the FAX image signal stored in a FAX signal buffer 13015 is output to CS via the public telephone line 13030.

In the above example, the FAX image signal is temporarily stored in the FAX signal buffer 13015. In practice, it is sufficient if FAX 13000 does not start until the CS carrier detection circuit 13016 detects the CS carrier signal. In an ordinary case, FAX 13000 does not start transmitting the FAX image data unless the FAX carrier is received from CS. In this case, the FAX signal buffer 13015 may be omitted.

Figure 34:
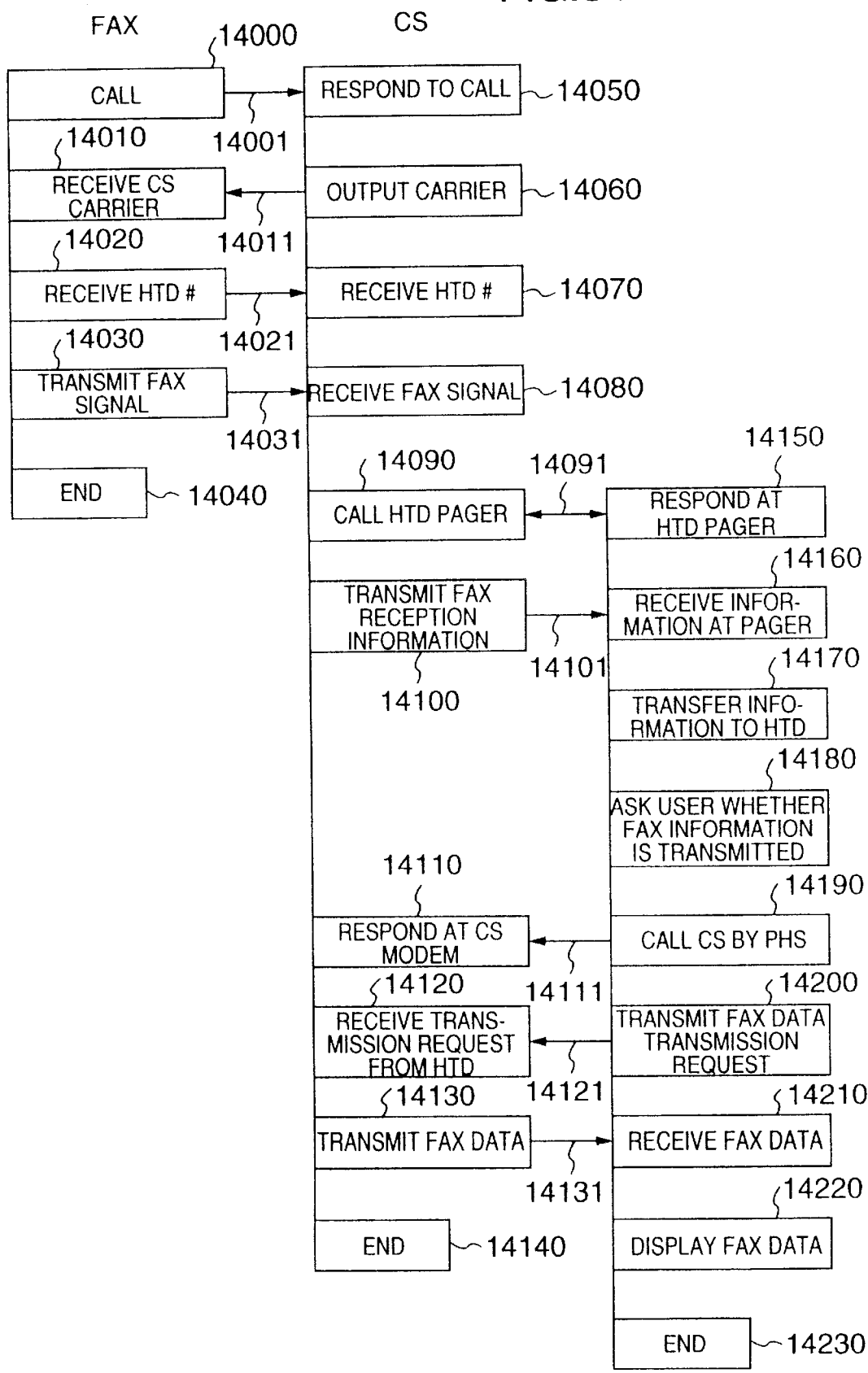
FIG. 34 is a flow chart illustrating the processes and data flows of the constituent elements of the data transfer system of this invention.

FIG. 34 is a flow chart illustrating processing to be executed by the constituent elements and data flows of the data transfer system of this invention. The left side indicates the operation flow of an originating FAX, the center side indicates the operation flow of CS, and the right side indicates the operation flow of an originating handheld terminal device. The originating FAX first calls CS (Step 14000) and CS responds to this call (Step 14050). A signal direction 14001 is from FAX to CS. Next, CS outputs a CS carrier (Step 14060), and this carrier 14011 is sent to FAX which receives it (Step 14010). After the originating FAX confirms from the CS carrier an establishment of a connection to CS, it transmits the originating handheld terminal device number (HTD #) to CS (Step 14020), and CS receives this HTD # (Step 14070). Lastly, FAX transmits the FAX image signal to CS (Step 14030), and CS receives this FAX image signal CS (Step 14080). The operations of FAX are completed (Step 14040). These operations are quite the same as ordinary FAX operations except the transmission of the HTD #. The HTD # in addition to the telephone number may be manually transmitted or automatically transmitted by using the buffering adapter shown in FIG. 33.

Next, CS calls the pager connected to a destination handheld terminal device (Step 14090), and the pager starts the reception operation (Step 14150).

CS transmits a FAX arrival message and information on the FAX image data to the pager (Step 14100), and the pager receives the information (Step 14160). Thereafter, the pager transfers the received information to the handheld terminal device (Step 14170), and the handheld terminal device displays it as shown in FIG. 30 to ask the user of the handheld terminal device whether the FAX image data is transmitted or not (Step 141800). If the user instructs that the FAX image data is transmitted to the handheld terminal device, this device calls CS by using the PHS (Step 14190), and the modem of CS responds to this call (Step 14110). The handheld terminal device transmits a transmission request signal for the FAX image data to CS (Step 14200), and after CS receives the transmission request signal (Step 14120), it transmits the FAX image data to the handheld terminal device (Step 14130). The handheld terminal device receives the transmitted FAX image data (Step 14210), and displays it on the screen of the handheld terminal device (Step 14220) to terminate a sequence of operations (Steps 14140 and 14230).

Figure 35:
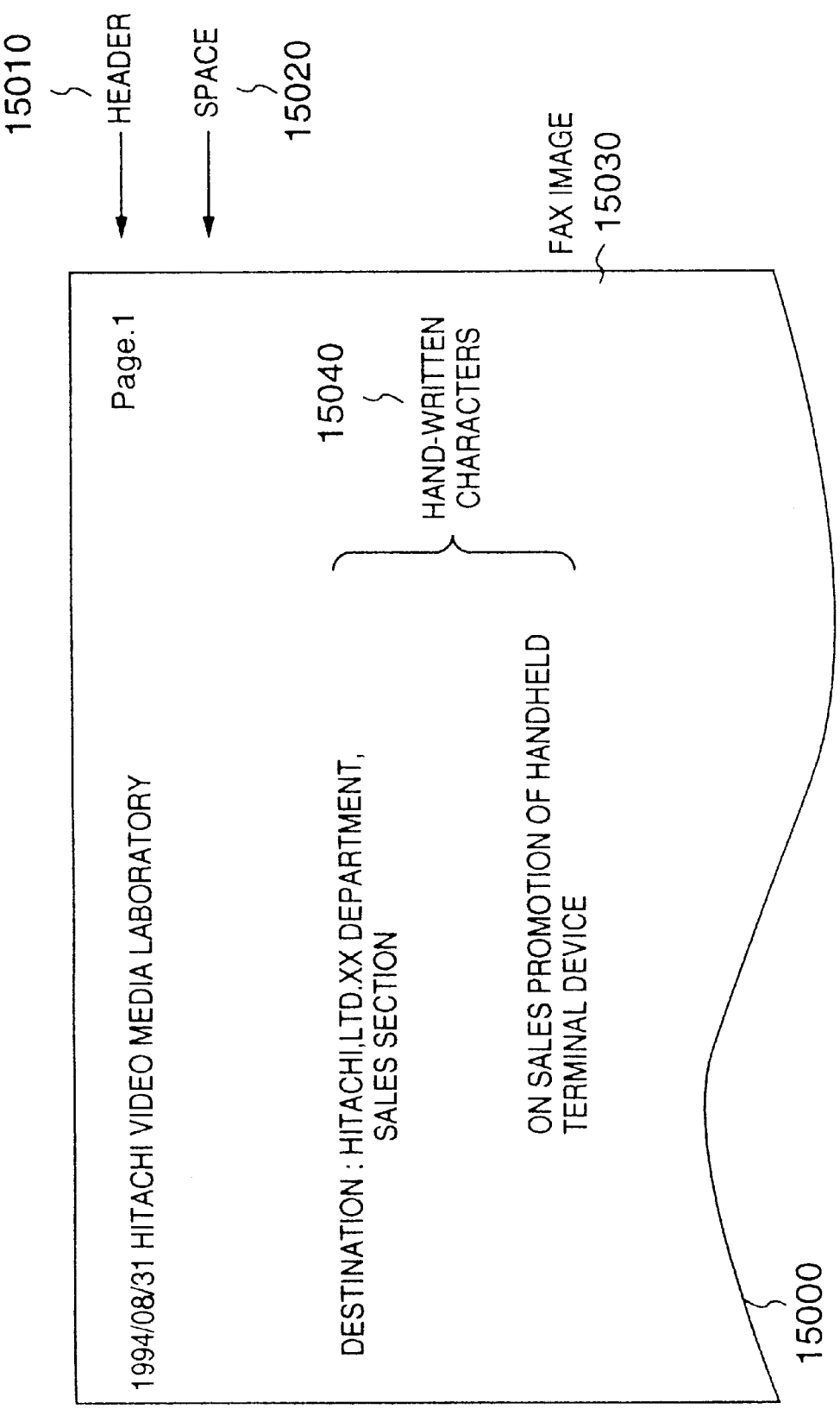
FIG. 35 is a diagram illustrating a FAX header separation and pattern recognition processing illustrated in FIG. 28.

FIG. 35 is a diagram illustrating the separation of a FAX header and the pattern recognition illustrated in FIGS. 28A to 28C. In FIG. 35, a FAX image 15030 is stored in HDD of CS as a two-dimensional bit map image (one bit per each pixel), and is constituted by a header portion 15010 and a hand-written character portion 15040. Of these portions, the handwritten portion is difficult to be pattern-recognized because it contains various character sizes, shapes, and clarity degrees. The hand-written portion is transmitted to the destination handheld terminal device in the form of bit map image. Since the header portion 15010 is transmitted from an originating FAX generally in the form of digital image and the character size and shape are constant and the character clarity degree is high, it is easy to be pattern-recognized. However, since the header portion 15010 and the hand-written portion 15040 are contained in the same bit map image, it is necessary to separate them. In this embodiment, this separation is performed by positively using a space (blank) portion 15020 which is always inserted between the header portion 15010 and hand-written portion 15040.

Figure 36:
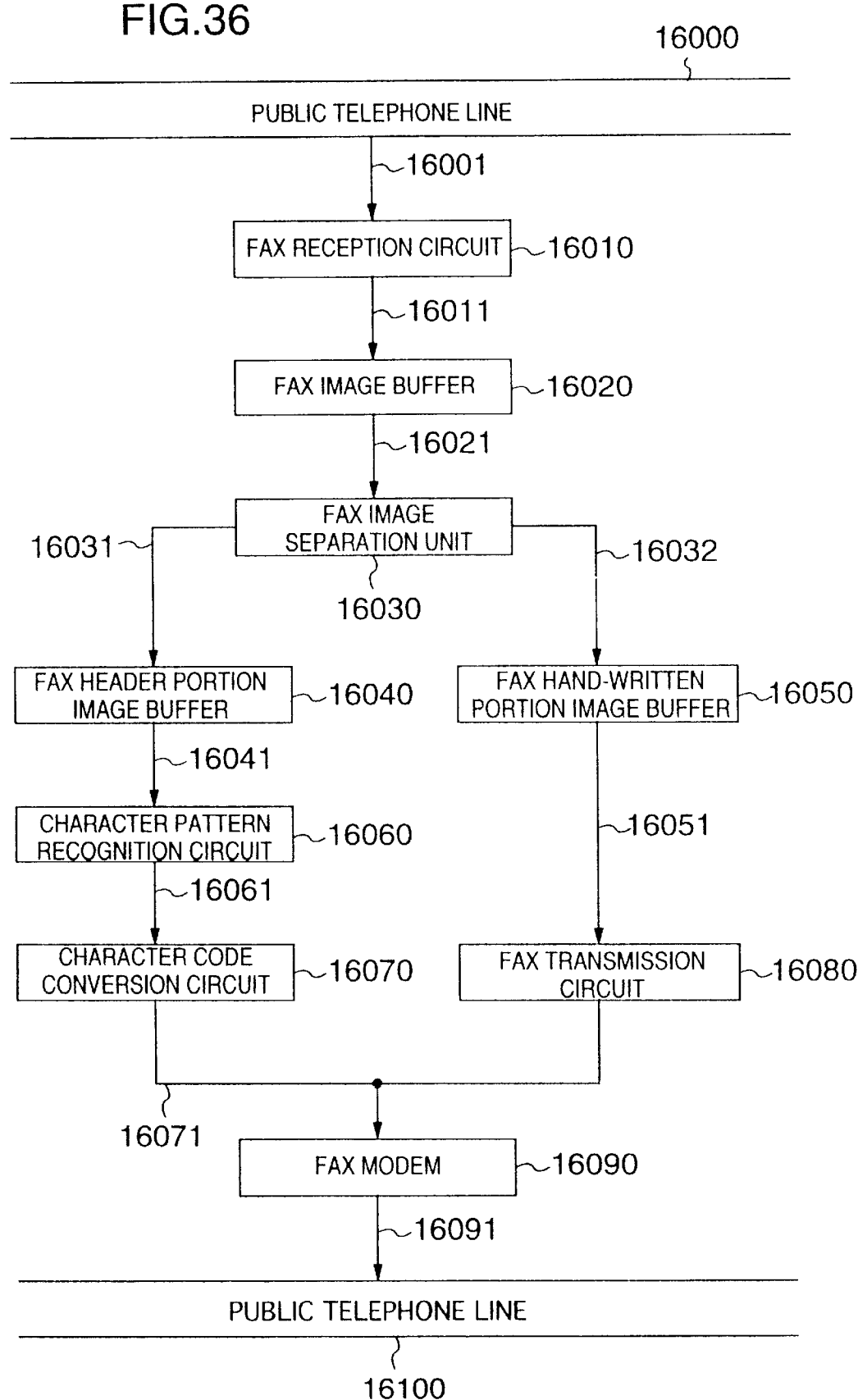
FIG. 36 is a block diagram showing an example of a circuit for performing the FAX header separation and pattern recognition processing illustrated in FIG. 28.

FIG. 36 is a block diagram showing an example of circuit for performing the separation of a FAX header and the pattern recognition illustrated in FIGS. 28A to 28C. In FIG. 36, FAX image data sent from a public telephone line 16000 is converted into digital image data by a FAX reception circuit 16010, and stored in FAX image buffer 16020. Next, a FAX image separation unit 16030 detects the space portion described with FIG. 35 from the image data and separates the FAX image data into the header portion and hand-written portion. The header portion is stored in a FAX header portion image buffer 16040, and its bit map information is dissolved into each character bit map image by a character pattern recognition circuit 16060. Thereafter, each character bit map image is converted into a character code by a character code conversion circuit 16070, and transmitted from a FAX modem 16090 over a public telephone line 16100 to the destination handheld terminal device in accordance with the formats shown in FIG. 29. The hand-written portion is stored in a FAX hand-written portion image buffer 16050, and when a FAX image transmission request is sent from the destination handheld terminal device, the FAX image is read from the FAX hand-written portion image buffer 16050, and thereafter it is transmitted from the FAX modem 16090 over the public telephone line 16100 to the handheld terminal device.

Figure 37:
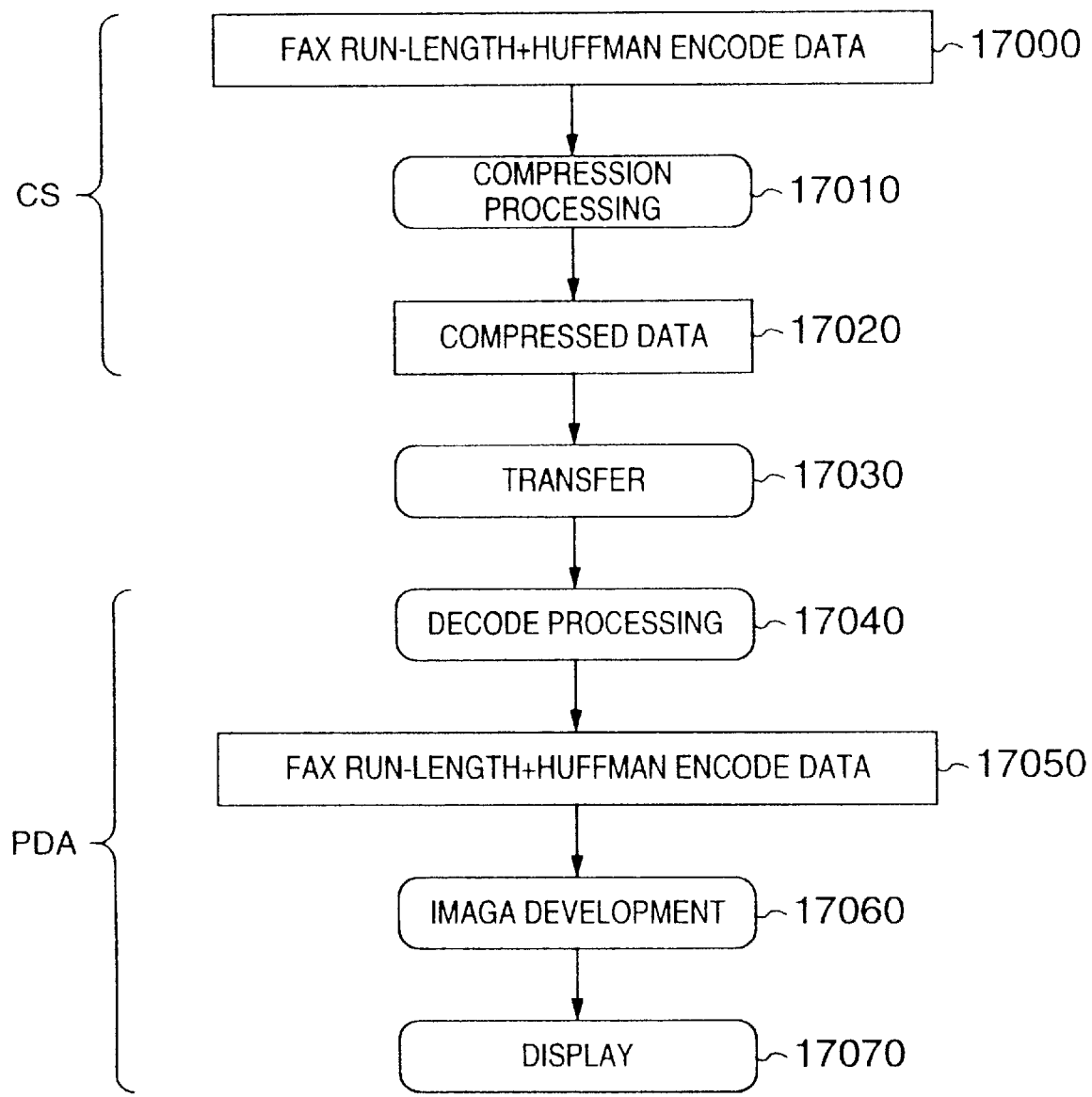
FIG. 37 is a flow chart illustrating an example of image data compression and recovery processing to be executed by the data transfer system of this invention.

FIG. 37 is a flow chart illustrating an example of an image data compression and recovery process to be executed by the data transfer system of this invention. In this embodiment, since the FAX image data is temporarily stored at CS, the data compression factor is improved more than the FAX run-length format and therefore the image data can be transmitted in a short time to the handheld terminal device. Referring to FIG. 37, CS receives a FAX run-length and Huffman encode data 17000. FAX has only one line buffer for transferring image data one line after another and printing each line at once, whereas CS can store the whole FAX image in the memory at the same time. In this embodiment, data sent in one-dimension is compressed (Step 17010) to generate compressed data 17020. The compressed data is stored in HDD of CS and transmitted to a destination handheld terminal device (Step 17030). Since the compressed data 17020 is compressed more than the original FAX run-length and Huffman encode data 17000, the transfer time is short. Furthermore, hand shaking necessary for digital data transfer and a retransmission processing for error occurrence can be performed so that the FAX data can be transferred more reliably. The destination handheld terminal device which received the compressed data 17020 performs a corresponding decode processing (Step 17040) to recover the original FAX run-length and Huffman encode data 17050. This original data is developed into a bit map image (Step 17060) to display it on the screen of the handheld terminal device (Step 17070).

Figure 38:
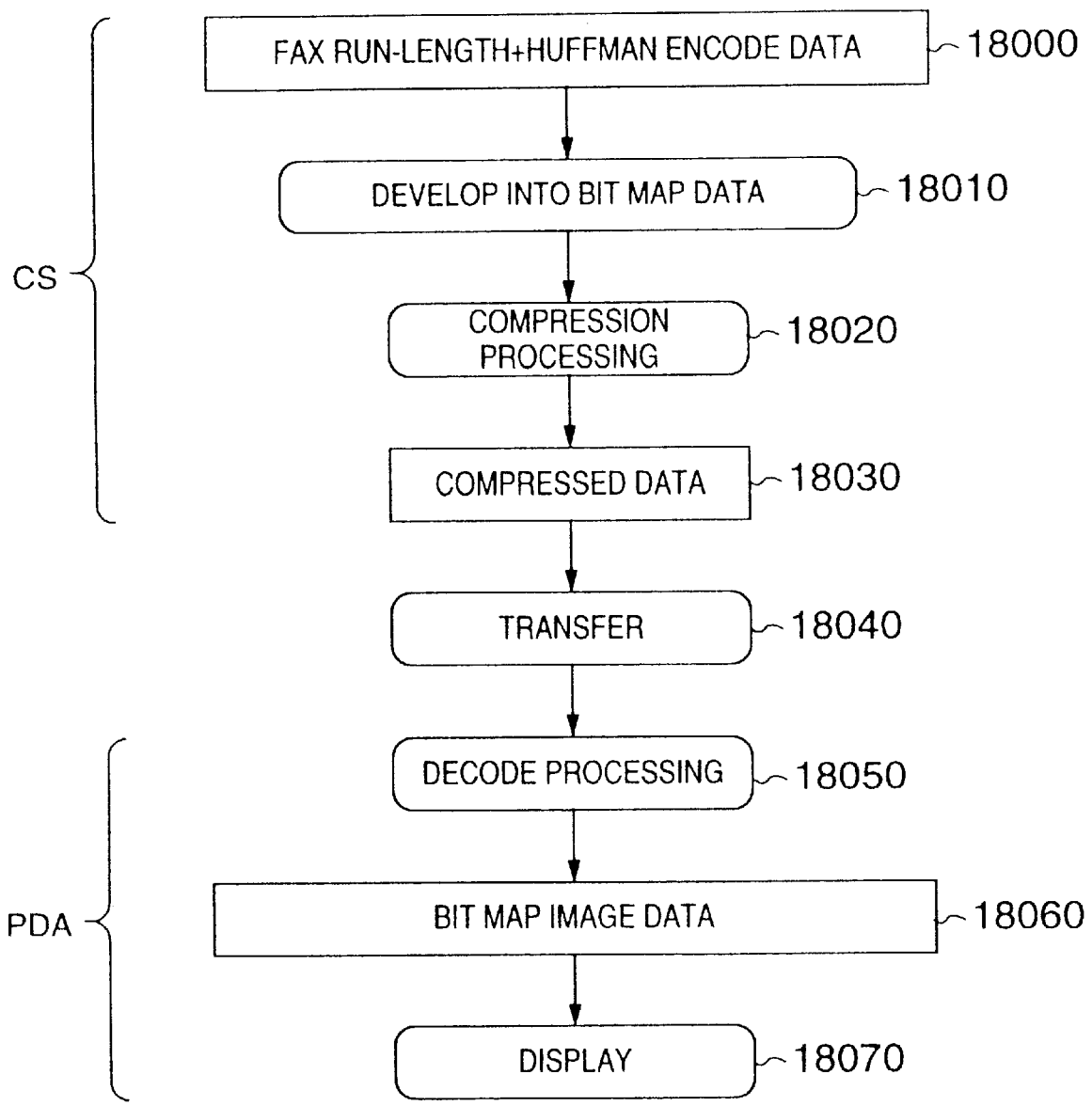
FIG. 38 is a flow chart illustrating another example of image data compression and recovery processing to be executed by the data transfer system of this invention.

FIG. 38 is a flow chart illustrating another example of an image data compression and recovery processing to be executed by the data transfer system of this invention. Similar to the case of FIG. 37, since the FAX image data is temporarily stored at CS, the data compression factor is improved more than the FAX run-length format and therefore the image data can be transmitted in a short time to the handheld terminal device. Referring to FIG. 38, CS receives a FAX run length and Huffman encode data 18000. FAX has only one line buffer for transferring image data one line after another and printing each line at once, whereas CS can store the whole FAX image in the memory at the same time. In this embodiment, data sent in one-dimension is once developed into bit map data (Step 18010) to check two-dimensional correlation and perform a compression processing for obtaining a further improved compression efficiency (e.g., block encode+Huffman encode) (Step 18020). The generated compressed data 18030 is stored in HDD of CS and transmitted to a destination handheld terminal device (Step 18040). Similar to the case of FIG. 37, the handheld terminal device receives the transferred compressed data and performs a decode processing (Step 16050) to reconfigure bit map image data 18060 and display it on the screen of the handheld terminal device (Step 18070).

In both the cases of FIGS. 37 and 38, the FAX image data is compressed by the one dimension run-length+Huffman encode which is a general FAX compression scheme, and in addition since the whole FAX image data is temporarily stored at CS, a highly efficient compression processing is possible. Particularly in the compression processing illustrated in FIG. 38, since the two-dimensional correlation is used, the original bit map image can be compressed more efficiently and the security of image contents is better.

Figure 39:
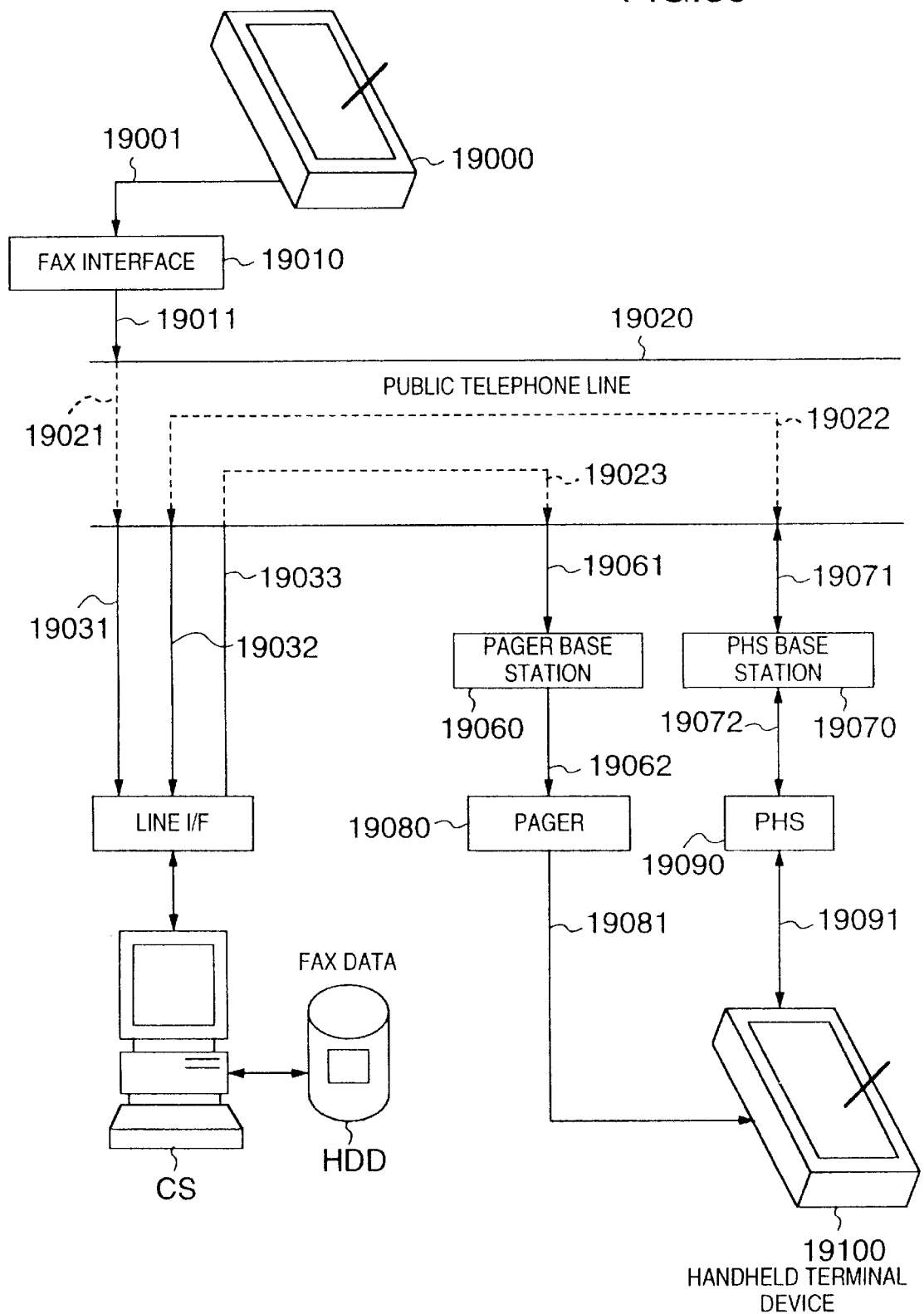
FIG. 39 is a block diagram showing the overall structure of a data transfer system wherein a data transmission station is a handheld terminal device, according to another embodiment of the invention.

FIG. 39 is a block diagram showing the overall structure of a data transfer system wherein a data transmission station is a handheld terminal device, according to another embodiment of the invention. In this embodiment, the station from which the FAX image data is transmitted is not a FAX as shown in FIG. 21, but a handheld terminal device. In FIG. 39, the structures of CS 19040 receiving FAX image data and the destination handheld terminal device 19100 are the same as those shown in FIG. 21, and so the description thereof is omitted. The feature of this embodiment resides in that the station from which FAX image data is transmitted is a handheld terminal device 19000. Specifically, FAX image data to be transmitted from the handheld terminal device 19000 is transmitted via a FAX interface over a public telephone line 19020 to CS. Consider now the case wherein the FAX image data is transmitted directly from the originating handheld terminal 19000 device to the destination handheld terminal device 19100. If reception of the FAX image data is impossible from some reason, it is necessary for the originating handheld terminal device to frequently retransmit it. Many FAXes have a retransmission function as a standard specification. However, if the originating station is a handheld terminal device, it is necessary to access the public telephone line 19020 at each retransmission by radio communications or the like. Each time retransmission is performed, a large amount of electric power is consumed and the originating handheld terminal device 19000 loses an allowable operating time. With the interposition of CS as in this embodiment, the originating handheld terminal device 19000 can transmit the FAX image data to the other handheld terminal device, without being affected by the conditions of the destination. However, also in this case, there is a possibility of the busy state of CS 19040 itself. This can be solved by providing a plurality of telephone lines between CS 19040 and the public telephone line.

FIG. 40 is a block diagram showing the overall structure of a data transfer system wherein FAX image data transmitted to a handheld terminal device is transmitted to another handheld terminal device of another FAX, according to still another embodiment of the invention. In FIG. 40, an originating FAX #1 20000 transmits FAX image data to CS 20110 for the transmission to a destination HTD #1 20010. In response to this, CS 20110 sends a FAX arrival message to the destination HTD #1 20010 via a handheld phone 20030 or the like. The user of the HTD #1 20010 confirms the brief contents of the FAX image data and the received FAX image data and judges whether the FAX image data is required to be sent to another handheld terminal device. For example, if it is judged that the FAX image data is required to be transmitted to the user of an HTD #2 20120, the HTD #1 20010 requests CS 20110 to transmit a FAX arrival message like that the HTD #1 20010 received or the FAX image data stored at CS 20110, to the HTD #2 20120.

With the above operations, the HTD #1 20010 is not required to retransmit a large amount of FAX image data so that the power consumption can be economized. Particularly, if it is necessary to perform a broadcast transmission to a plurality of handheld terminal devices and FAXes, all of these transmissions can be passed to CS 20110 which is powered from a commercial power line and can use a wired telephone line so that the power consumption can be considerably and efficiently economized. If the capacity of FAX image data is too large and the destination HTD #1 20010 cannot receive all the data, or if a display resolution of a handheld terminal device is inferior to the resolution of FAX and all the FAX image data cannot be recognized clearly on the screen of the handheld terminal device, the user of the destination HTD #1 20010 can request CS 20110 to retransmit the FAX image data to the FAX #2 installed nearby.

Figure 41A:
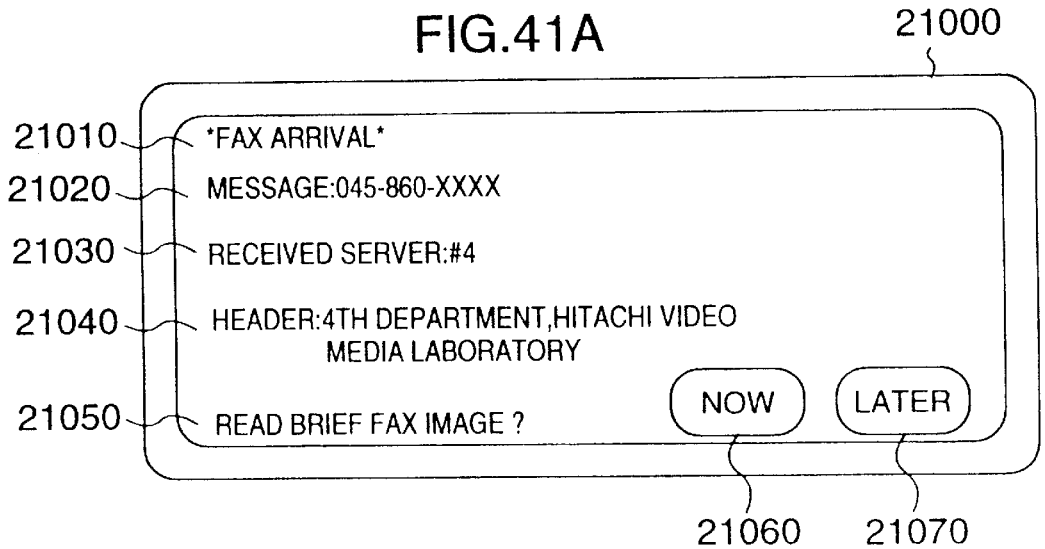
Figure 41B:
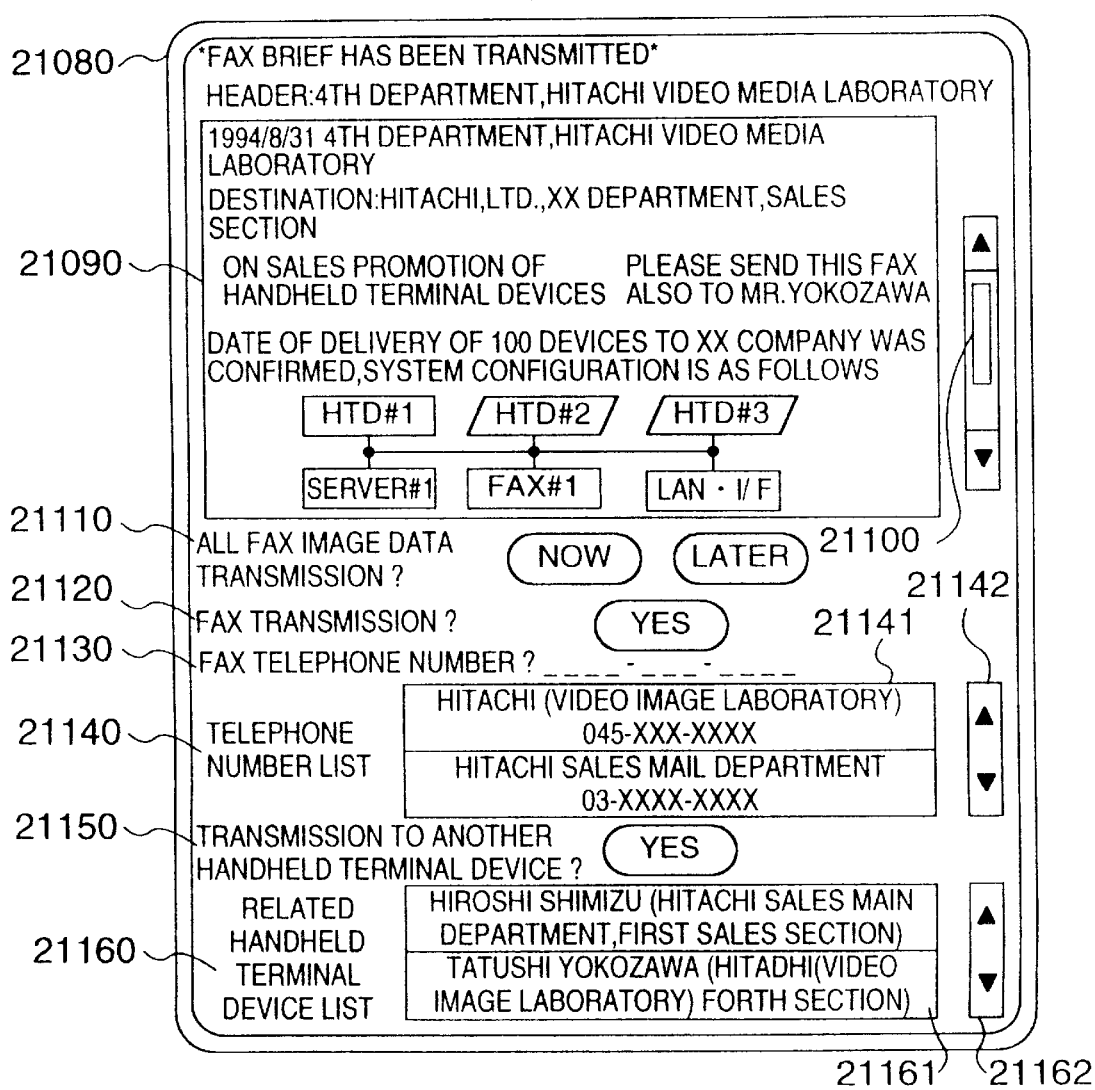

FIGS. 41A and 41B illustrate examples of how a restriction on the data transfer system to be caused by a handheld terminal device is dealt with. These examples illustrate how a meaningless case is dealt with wherein the display resolution at a destination handheld terminal device is lower than the resolution of an originating FAX so that transmitting all the FAX image data is meaningless.

FIG. 41A shows messages displayed at a destination handheld terminal device after CS receives FAX image data and sends a FAX arrival message. The messages shown in FIG. 41A are fundamentally the same as those shown in FIG. 30, and so the whole description thereof is omitted. However, the message 21050 is different and it requests not the transmission of all the FAX image data but rather the transmission of brief FAX image data.

FIG. 41B shows an example of the FAX brief image data received by a destination handheld terminal device. In FIG. 41B, displayed on a display screen 21090 of the destination handheld terminal device are a FAX brief image data 21090, an icon 21100 used for scrolling the brief image data 21090 up and down, and an icon group for providing the handheld terminal device with various commands. Generally, the vertical length of FAX image data is infinite. Therefore, the FAX brief image data 21090 is adapted to be scrolled up and down by using the scroll icon 21100.

The FAX brief image data may be 1/(n by n) pixels among n by n pixels in vertical and horizontal directions, or may use black pixels for n by n pixels if the average value of n by n pixels exceeds a threshold value. In this manner, the FAX brief image data whose total number of pixels is reduced by any one of various pixel reducing methods can be generated, transmitted, and displayed at the handheld terminal device. It is difficult to read fine characters of the FAX brief image data. It becomes necessary therefore to transmit all FAX image data prior to reducing the number of pixels. An icon 21110 is used by a user in order to instruct whether all FAX image data are to be at transmitted or not. If all FAX image data are to be transmitted at once, an icon "Now" is used, whereas if the transmission is performed later or all the FAX image data is not necessary to be transmitted, an icon "Later" is used.

Since the display resolution at the handheld terminal device is generally lower than the resolution of FAX, it can be considered that all the FAX image it can be considered that all the FAX image data is preferably transmitted to another FAX installed near the user, similar to the case described with FIG. 40. In this case, prior to instructing the transmission to FAX at 21120, a nearby FAX telephone number is input at 21130 or the FAX telephone number is selected from a FAX telephone number list 21140, to thereby designate the destination FAX. As described with FIG. 40, if the FAX image data is to be transmitted to another handheld terminal device, a transmission command is designated at 21150. The destination may be selected from a handheld terminal device list 21160 and transmitted. The telephone number list 21140 and handheld terminal device list 21160 are linked with the database such as an address note of the handheld terminal device, and they may be referred to as a reference database. As described above, the FAX brief image data can be transferred to FAX near a destination handheld terminal device. Only the FAX brief image data with a minimum information amount which the handheld terminal device can display, is transmitted so that transmission time can be saved.

Figure 42:
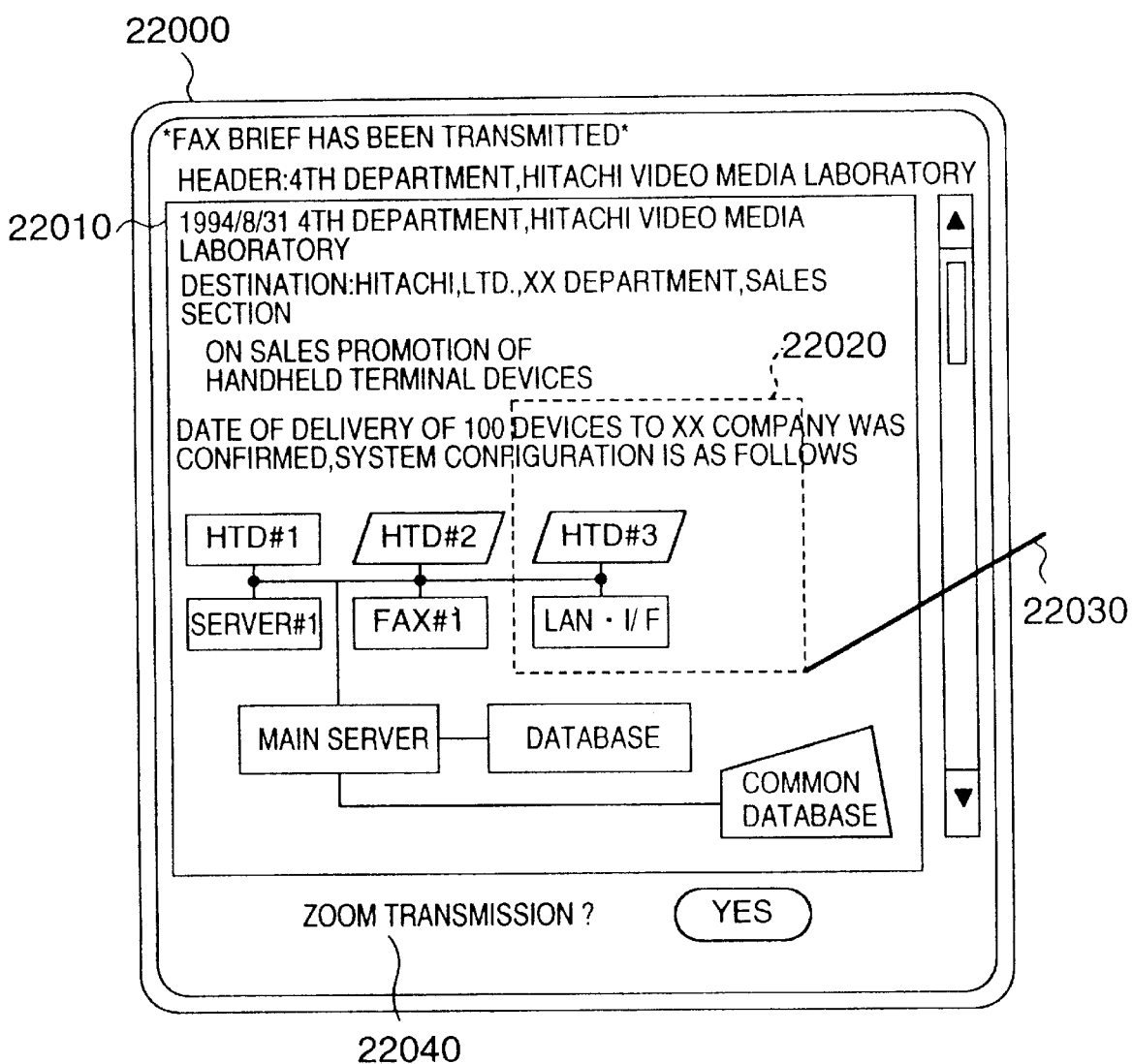

FIG. 42 illustrates another example of how a restriction on the data transfer system to be caused by a handheld terminal device is dealt with. As described with FIGS. 41A and 41B, the FAX image data itself is transmitted after the FAX brief image data is transmitted to a destination handheld terminal device. As described earlier, the display of the handheld terminal device has a low resolution. Therefore, even if all FAX image data is transmitted, it is difficult to display it clearly. However, if there is a portion to be referred to in detail after the FAX brief image data first transmitted is checked, it is relatively simple to zoom up only this portion and display it.

In order to realize such a processing, it is possible to zoom up the portion after all FAX image data is transmitted. However, in this embodiment, part of the FAX image data 22010 is selected as a zoom area 22020, and only the zoom area is transferred to save the transfer time. In FIG. 42, the destination handheld terminal device has a touch panel display device combined with a display unit such as liquid crystal panel and a touch panel. By pointing with a pen 22030 an area of a displayed FAX brief image 22010 to be zoomed up, the zoom-up area 22020 is defined. An icon 22040 is used for transmitting the zoom-up area so that all of the FAX image data contained in the designated zoom-up area is transmitted from CS. The transmitted FAX image data is displayed on the screen of the handheld terminal device. The magnification factor of the zoom-up area differs depending upon the defined zoom-up area. All the FAX image data may be displayed by using a scroll window, or the zoom-up area may be automatically zoomed up or down to display it on the whole screen area of the handheld terminal device in accordance with the algorithms described with FIGS. 41A to 41B.

Figure 43A:
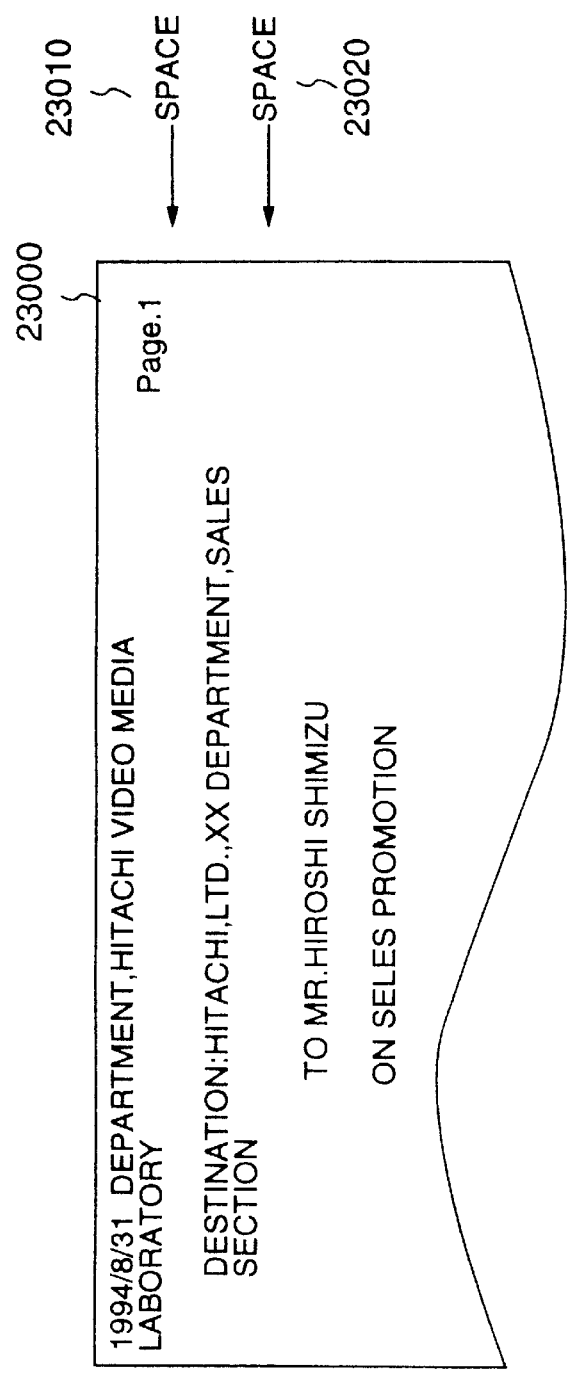
FIGS. 43A and 43B illustrate a processing of automatically deleting an unnecessary portion of FAX image data and transmitting the remaining FAX image data, to be executed by the data transfer system of this invention.
Figure 43B:
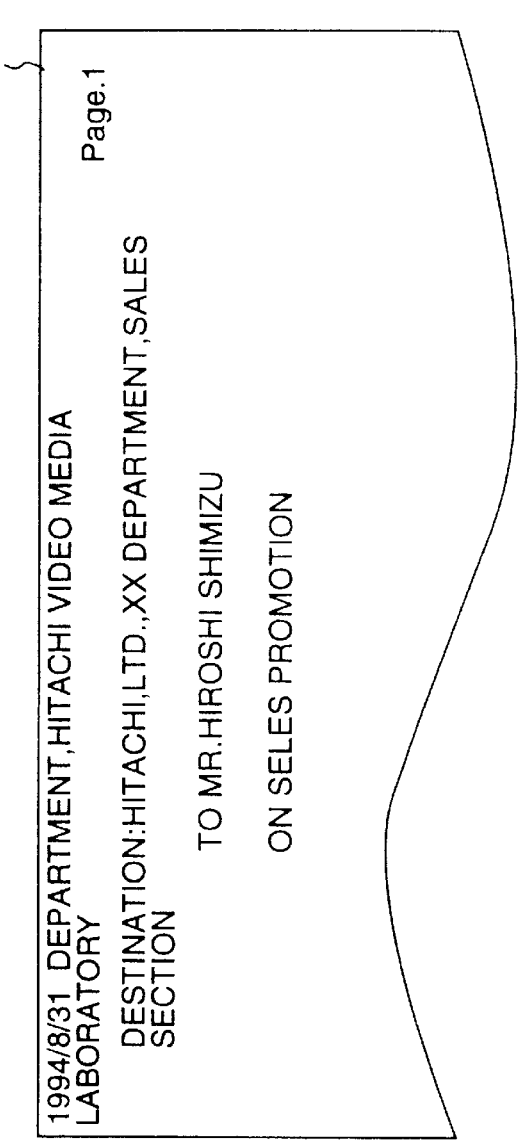

FIGS. 43A and 43B illustrate a processing of automatically deleting an unnecessary portion of FAX image data and transmitting the remaining FAX image data to be executed by the data transfer system of this invention. FIG. 43A shows FAX image data 23000 sent from an originating FAX, the data containing lateral straight blank portions (23010, 23020) between the header and hand-written blank portion and in the hand written character portion. The lateral straight portions are detected by the method similar to the FAX image separation unit described with FIG. 36, and the detected blank portions are deleted. In this case, if the blank portions are completely deleted, the header and hand-written character portion and the upper and lower characters in the hand-written character portion become too near to each other and are difficult to read. Therefore, a certain number of blank lines are remained undeleted.

In this example, a blank portion is detected for the reduction of the image size. Other methods of reducing the image size may be applied such as detecting a continuity of a line constituting a FAX hand-written image and shortening the length of the line. This method is effective if the block diagram such as shown in FIG. 42 is transmitted. However, if an image such as a mechanical design drawing is transmitted, the scale such as a ratio of a vertical scale to a horizontal scale takes a value different from the correct ratio. This can be solved by preparing a command for canceling this function and by making a FAX transmitting user or a handheld terminal device user issue this command. If a FAX user in particular uses this command, the command may be added to the digital signal such as the handheld terminal device indicated at (2) in FIG. 26 for the transmission to CS. On the other hand if a handheld terminal device user uses this command, the command may be added to the transmission instruction made by PHS for the transmission to CS.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A data transfer system having a host computer for receiving data, storing the received data, and transmitting the stored data, and at least one handheld terminal device with a communication function for receiving data transmitted from said host computer, wherein:

said host computer comprises:

a storage unit for storing the received data;

a transmission control unit for performing a transmission control for transmitting a new data arrival notice command to said at least one associated handheld terminal device, said new data arrival notice command including a command name and a command parameter, said command parameter including data identifier information for a data file identifier for identifying the received data on a file basis and connection information necessary for said at least one handheld terminal device to access said host computer but not including the received data itself, and a host side transmission/reception control unit for performing reception processing of a transmission request command transmitted from said at least one associated handheld terminal device, said transmission request command including a command name and a command parameter for identifying the received data and transmission processing of the received data identified by said transmission request command to said at least one associated handheld terminal device; and said at least one associated handheld terminal device comprises:

a new message arrival analysis processing unit for analyzing said received new data arrival notice command and deriving said data identifier information and said connection information, a connection establishment processing unit for performing connection processing of a communication line to said host computer in accordance with said connection information, and a terminal side transmission/reception control unit for controlling transmission processing of transmitting said transmission request command in accordance with said data identifier information and reception processing of receiving the received data transmitted from said host computer.

2. A data transfer system according to claim 1, wherein said host side transmission/reception control unit performs the transmission processing of the same data to a plurality of handheld terminal devices simultaneously.

3. A data transfer system according to claim 2, wherein said at least one associated handheld terminal device further comprises a retry control unit for controlling said connection establishment processing unit to repetitively perform the communication line connection processing by using said connection information of said new data arrival command until a predetermined number of retries are carried out or a communication line is established.

4. A data transfer system according to claim 3, wherein said connection establishment processing unit performs the communication line connection processing by radio or a wired telephone line.

5. A data transfer system according to claim 1, wherein said at least one associated handheld terminal device further comprises a retry control unit for controlling said connection establishment processing unit to repetitively perform the communication line connection processing by using said connection information of said new data arrival command until a predetermined number of retries are carried out or a communication line is established.

6. A data transfer system according to claim 1, wherein said connection establishment processing unit performs the communication line connection processing by radio or a wired telephone line.

7. A data transfer system according to claim 1, wherein, in response to a transmission data transfer command from said at least one handheld terminal device having received said notice command notified by said host computer and having confirmed said received transmission data or attribute information of said received transmission data, said host computer transfers said received transmission data to another handheld terminal device or a designated output device.

8. A data transfer system, comprising:

at least one handheld terminal device for generating, storing, and displaying data to be transmitted and received, said handheld terminal device having connection means for connecting to a public telephone line and data transmission control means for performing transmission/reception of data transmitted and received via said public telephone line; and a communication server having connection means for connecting to said public telephone line, data transmission control means for performing transmission/reception of the transmitted and received data via said public telephone line, and a storage unit for storing received transmission data, wherein said communication server sends a notice command including a command name and a command parameter, via said public telephone line, said command parameter including a data file identifier for identifying for the received transmission data on a file basis and connection information necessary for said handheld terminal device to access said communication server after analysis of said notice command but not including the received transmission data, to said handheld terminal device designated by said received transmission data, and, in response to a transmission data transfer request command transmitted from said handheld terminal device, said transmission data transfer request command including a command name and a command parameter including said data file identifier obtained by analyzing said notice command, transmits the received transmission data to said handheld terminal device.

9. A data transfer system according to claim 8, wherein each said handheld terminal device includes a pager, and said communication server sends said notice command by transmitting a predetermined call signal to the pager of said handheld terminal device designated by said transmission data.

10. A data transfer system according to claim 9, wherein each said handheld terminal device further includes a handheld phone as said connection means and said data transmission control means, and said handled terminal device which is notified of said notice command connects to said communication server via said public telephone line by using said handheld phone, and thereafter transmits said transmission data transfer request via said public telephone line to thereby receive said stored transmission data from said communication server via said public telephone line, and wherein in each said handheld terminal device, a connection to said communication server by said handheld phone is performed after confirming that said handheld phone becomes usable.

11. A data transfer system according to claim 9, wherein said notice command which is notified to the pager of said handheld terminal device contains attribute information indicating a data file or an electronic mail of said transmission data received by said communication server.

12. A data transfer system according to claim 11, wherein said attribute information of said transmission data contains server ID information for identifying said communication server storing said transmission data.

13. A data transfer system according to claim 11, wherein the attribute information of said transmission data in said message further contains information for identifying the originating station of said transmission data.

14. A data transfer system according to claim 8, wherein each said handheld terminal device is equipped with a handheld phone, and said communication server sends said notice command by transmitting a predetermined call signal to the handheld phone of said handheld terminal device designated by said transmission data.

15. A data transfer system according to claim 8, wherein in response to a transmission data transfer command from said designated handheld terminal device having received said notice command notified by said communication server and having confirmed said received transmission data or attribute information of said received transmission data, said communication server transfers said received transmission data to another handheld terminal device or a designated output device.

16. A data transfer system according to claim 8, wherein said transmission data contains image data run-length encoded as in FAX, and said communication server transmits said image data with a no-signal portion having a blank line being deleted to said designated handheld terminal device or a designated output device.

17. A data transfer system, comprising:
at least one handheld terminal device for generating, storing, and displaying data to be transmitted and received, said handheld terminal device having connection means for connecting to a public telephone line and data transmission control means for controlling transmission/reception of data transmitted and received via said public telephone line; and
a communication server having connection means for connecting to said public telephone line, data transmission control means for controlling transmission/reception of the transmitted and received data via said public telephone line, and a storage unit for storing received transmission data,
wherein said communication server sends information including identification information for specifying the transmitted data, but not including the received data itself, to said handheld terminal device designated by the transmitted data, and in response to a transmission data transfer request from said handheld terminal device, transmits the transmitted data via said public telephone line, and
wherein said transmission data contains image data runlength encoded as in FAX, said communication server performs a predetermined data compression processing for two-dimensional bit map image data obtained by developing said image data when said transmission data is transmitted to said designated handheld terminal device, and said designated handheld terminal device performs a predetermined data expansion processing corresponding to said data compression processing when said transmission data is received, to recover and display said transmission data.

18. A data transfer system, comprising:
at least one handheld terminal device for generating, storing, and displaying data to be transmitted and received, said handheld terminal device having connection means for connecting to a public telephone line and data transmission control means for performing transmission/reception of data transmitted and received via said public telephone line; and
a plurality of communication servers interconnected by a dedicated LAN each having connection means for connecting to said public telephone line, data transmission control means for performing transmission/reception of data transmitted and received via said public telephone line, and a storage unit for storing received transmission data,
wherein a first one of said communication servers having received said transmission data via said public telephone line transfers said transmission data via said LAN to a second one of said communication servers installed near to said handheld terminal device designated by said transmission data, and said second communication server sends a notice command via said public telephone line to said handheld terminal device, said notice command including a command name and a command parameter, said command parameter including a data file identifier for identifying the received transmission data on a file basis and connection information necessary for said handheld terminal device to access said second communication server after analysis of said notice command, but not including the received transmission data.

19. A data transfer system, comprising:
at least one handheld terminal device for generating, storing, and displaying data to be transmitted and received, said handheld terminal device having connection means for connecting to a public telephone line and data transmission control means for performing transmission/reception of data transmitted and received via said public telephone line; and
a plurality of communication servers interconnected by a dedicated LAN each having connection means for connecting to said public telephone line, data transmission control means for controlling transmission/reception of data transmitted and received via said public telephone line, and a storage unit for storing received transmission data,
wherein a first one of said communication servers having received said transmission data via said public telephone line sends a notice command via said public telephone line to said handheld terminal device, said notice command including a command name and a command parameter, said command parameter including a data file identifier for identifying the received transmission data on a file basis and connection information necessary for said handheld terminal device to access said second communication server after analysis of said notice command, but not including the received transmission data.

20. A data transfer system, comprising:
at least one handheld terminal device for generating, storing, and displaying data to be transmitted and received, said handheld terminal device having connection means for connecting to a public telephone line and data transmission control means for controlling transmission/reception of data transmitted and received via said public telephone line; and
a communication server having connection means for connecting to said public telephone line, data transmission control means for controlling transmission/reception of the transmitted and received data via said public telephone line, and a storage unit for storing received transmission data,
wherein said communication server sends information including identification information for specifying the transmitted data, but not including the received data itself, to said handheld terminal device designated by the transmitted data, and in response to a transmission data transfer request from said handheld terminal device, transmits the transmitted data via said public telephone line, and
wherein said transmission data contains image data runlength encoded as in FAX, and said communication server transmits said image data with pixels thinned by a predetermined scheme to said designated handheld terminal device, wherein in response to a total transfer instruction from said designated handheld terminal device having confirmed said thinned and transmitted image data, said communication server transfers all of said transmission data to said designated handheld terminal device or a designated output device.

21. A data transfer system, comprising:
at least one handheld terminal device for generating, storing, and displaying data to be transmitted and received, said handheld terminal device having connection means for connecting to a public telephone line and data transmission control means for controlling transmission/reception of data transmitted and received via said public telephone line; and
a communication server having connection means for connecting to said public telephone line, data transmission control means for controlling transmission/reception of the transmitted and received data via said public telephone line, and a storage unit for storing received transmission data, wherein said communication server sends information including identification information for specifying the transmitted data, but not including the received data itself, to said handheld terminal device designated by the transmitted data, and in response to a transmission data transfer request from said handheld terminal device, transmits the transmitted data via said public telephone line, and wherein said transmission data contains image data run-length encoded as in FAX, and said communication server transmits said image data with pixels thinned by a predetermined scheme to said designated handheld terminal device, wherein in response to a partial transfer instruction from said designated handheld terminal device having confirmed said thinned and transmitted image data, said communication server transfers partial image data itself or partial image data with thinned pixels, of said image data in an area designated by said partial transfer instruction, to said designated handheld terminal device or a designated output device.

22. A handheld terminal device with a communication function, comprising:

new data arrival message reception controlling means for receiving a newly arrived data notice message indicating reception of new data; and transmission/reception controlling means for controlling data acquisition processing in accordance with the contents of said newly arrived data arrival notice command, wherein said newly arrived data notice command includes a command name and a command parameter, said command parameter including data identifier information for identifying said data and connection information necessary for said handheld terminal device to access a host which stores said new data but does not include of body of said new data, said reception controlling means has a newly arrived data notice command analysis processing unit for analyzing said received newly arrived data notice command and deriving said data identifier information and said connection information, and said transmission/reception controlling means has a connection establishment processing unit for performing a connection processing of a communication line in accordance with said connection information and received data transmission controlling means for controlling a transmission processing of said data in accordance with said data identifier information.

23. A handheld terminal device according to claim 22, further comprising a retry control unit for controlling to make said connection establishment processing unit repetitively perform a communication line connection processing by using said connection information of said newly arrived data notice command, until a predetermined number of retries are carried out or a communication line is established.

24. A handheld terminal device according to claim 22, further comprising a user confirmation processing unit for making a user judge whether an acquisition processing for said data is performed or not, said transmission/reception controlling means displaying contents of said new data arrival notice command to said user to control the acquisition processing for the body of said new data in accordance with an instruction determined in said user confirmation processing unit by a user's decision based on the display as to whether or not the body of said new data should be received.

* * * * *